(12) United States Patent
Rezayee et al.

(10) Patent No.: US 12,223,507 B2
(45) Date of Patent: *Feb. 11, 2025

(54) LINE-BASED CHIP CARD TAMPER DETECTION

(71) Applicant: Block, Inc., Oakland, CA (US)

(72) Inventors: Afshin Rezayee, Richmond Hill (CA); Malcolm Smith, Toronto (CA); Yue Yang, Toronto (CA); Jeremy Wade, San Francisco, CA (US); Max Guise, San Francisco, CA (US); Kamran Sharifi, Toronto (CA)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,325

(22) Filed: Apr. 20, 2023

(65) Prior Publication Data
US 2023/0267472 A1 Aug. 24, 2023

Related U.S. Application Data

(60) Continuation of application No. 17/366,891, filed on Jul. 2, 2021, now Pat. No. 11,669,842, which is a
(Continued)

(51) Int. Cl.
*G06Q 20/40* (2012.01)
*G06Q 20/10* (2012.01)
*G06Q 20/34* (2012.01)

(52) U.S. Cl.
CPC ......... *G06Q 20/409* (2013.01); *G06Q 20/102* (2013.01); *G06Q 20/341* (2013.01)

(58) Field of Classification Search
CPC .. G06Q 20/409; G06Q 20/102; G06Q 20/341; G06Q 20/4016; G07F 7/0873; G07F 7/12
See application file for complete search history.

(56) References Cited

U.S. PATENT DOCUMENTS

| 3,128,349 A | 4/1964 | Boesch et al. |
| 4,150,784 A | 4/1979 | Moorman et al. |

(Continued)

FOREIGN PATENT DOCUMENTS

| AU | 2324402 A | 6/2002 |
| AU | 2015/100744 B4 | 8/2015 |

(Continued)

OTHER PUBLICATIONS

"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
(Continued)

Primary Examiner — Sonji N Johnson
(74) Attorney, Agent, or Firm — Polsinelli PC

(57) ABSTRACT

A transaction device can implement a monitoring system to detect for tamper attempts at a chip card interface. The monitoring system can establish a baseline when no chip card is present in the chip card interface, or in some embodiments, when it is known that an authentic chip card is present in the slot. During subsequent evaluations of the chip card interface by the monitoring system, a response received by the monitoring system that deviates from the baseline can indicate that a tamper attempt at the chip card interface may have occurred. If a tamper attempt is determined by the monitoring system, a remedial or corrective action can be taken.

20 Claims, 12 Drawing Sheets

Related U.S. Application Data continuation of application No. 16/810,700, filed on Mar. 5, 2020, now Pat. No. 11,113,698, which is a division of application No. 15/439,685, filed on Feb. 22, 2017, now Pat. No. 10,621,590.

(56) References Cited

U.S. PATENT DOCUMENTS

| | | |
|---|---|---|
| 4,776,003 A | 10/1988 | Harris |
| 4,860,336 A | 8/1989 | D'Avello et al. |
| 5,221,838 A | 6/1993 | Gutman et al. |
| 5,351,296 A | 9/1994 | Sullivan |
| 5,388,155 A | 2/1995 | Smith |
| 5,408,513 A | 4/1995 | Busch, Jr. et al. |
| 5,714,741 A | 2/1998 | Pieterse et al. |
| 5,729,591 A | 3/1998 | Bailey |
| 5,740,232 A | 4/1998 | Pailles et al. |
| 5,798,507 A | 8/1998 | Kawagishi et al. |
| 5,838,773 A | 11/1998 | Eisner et al. |
| 5,850,599 A | 12/1998 | Seiderman |
| 5,867,795 A | 2/1999 | Novis et al. |
| 5,940,510 A | 8/1999 | Curry et al. |
| 6,010,067 A | 1/2000 | Elbaum |
| 6,098,881 A | 8/2000 | Deland, Jr. et al. |
| 6,098,888 A | 8/2000 | Praden |
| 6,144,336 A | 11/2000 | Preston et al. |
| 6,234,389 B1 | 5/2001 | Valliani et al. |
| 6,278,779 B1 | 8/2001 | Bryant et al. |
| 6,308,144 B1 | 10/2001 | Bronfeld et al. |
| 6,378,073 B1 | 4/2002 | Davis et al. |
| 6,426,944 B1 | 7/2002 | Moore |
| 6,481,623 B1 | 11/2002 | Grant et al. |
| 6,702,182 B1 | 3/2004 | Kanayama |
| 6,886,742 B2 | 5/2005 | Stoutenburg et al. |
| 6,990,683 B2 | 1/2006 | Itabashi |
| 7,003,316 B1 | 2/2006 | Elias et al. |
| 7,066,382 B2 | 6/2006 | Kaplan |
| 7,083,090 B2 | 8/2006 | Zuili |
| 7,163,148 B2 | 1/2007 | Durbin et al. |
| 7,210,627 B2 | 5/2007 | Morley et al. |
| 7,363,054 B2 | 4/2008 | Elias et al. |
| 7,370,804 B2 | 5/2008 | Ishii |
| 7,424,732 B2 | 9/2008 | Matsumoto et al. |
| 7,433,452 B2 | 10/2008 | Taylor et al. |
| 7,591,425 B1 | 9/2009 | Zuili et al. |
| 7,673,799 B2 | 3/2010 | Hart et al. |
| 7,712,670 B2 | 5/2010 | Sauerwein, Jr. et al. |
| 7,810,729 B2 | 10/2010 | Morley, Jr. |
| 7,896,248 B2 | 3/2011 | Morley, Jr. |
| 8,086,531 B2 | 12/2011 | Litster et al. |
| 8,126,734 B2 | 2/2012 | Dicks et al. |
| 8,265,553 B2 | 9/2012 | Cheon et al. |
| 8,397,988 B1 | 3/2013 | Zuili |
| 9,020,853 B2 | 4/2015 | Hoffman et al. |
| 9,088,403 B1 | 7/2015 | Caggioni et al. |
| 9,092,766 B1 | 7/2015 | Bedier et al. |
| 9,286,494 B1 | 3/2016 | Lamfalusi et al. |
| 9,317,848 B2 | 4/2016 | Hammad |
| 9,330,383 B1 | 5/2016 | Vadera |
| 9,424,445 B2 | 8/2016 | Lamfalusi et al. |
| 9,652,641 B2 | 5/2017 | Lamfalusi et al. |
| 9,679,286 B2 | 6/2017 | Colnot et al. |
| 9,697,388 B1 | 7/2017 | Jacobson et al. |
| 9,721,123 B1 | 8/2017 | Wade |
| 9,760,743 B2 | 9/2017 | Lamfalusi et al. |
| 9,858,448 B1 | 1/2018 | Terra et al. |
| 9,881,337 B2 | 1/2018 | Jaycobs et al. |
| 9,922,320 B2 | 3/2018 | Bonalle et al. |
| 9,953,353 B2 | 4/2018 | Singhal et al. |
| 10,002,268 B1 | 6/2018 | Terra et al. |
| 10,255,464 B2 | 4/2019 | Terra et al. |
| 10,318,952 B1 | 6/2019 | Wade et al. |
| 10,380,389 B1 | 8/2019 | Wade |
| 10,402,816 B2 | 9/2019 | Terra |
| 10,438,189 B2 | 10/2019 | Rezayee et al. |
| 10,621,590 B2 * | 4/2020 | Rezayee ............... G07F 7/0873 |
| 10,970,708 B2 | 4/2021 | Terra |
| 11,113,698 B2 | 9/2021 | Rezayee et al. |
| 2001/0029595 A1 | 10/2001 | Murata |
| 2002/0060249 A1 | 5/2002 | Perron |
| 2002/0091633 A1 | 7/2002 | Proctor |
| 2002/0153414 A1 | 10/2002 | Stoutenburg et al. |
| 2003/0067940 A1 | 4/2003 | Edholm |
| 2003/0131191 A1 | 7/2003 | Zhang et al. |
| 2003/0135418 A1 | 7/2003 | Shekhar et al. |
| 2003/0154414 A1 | 8/2003 | von Mueller et al. |
| 2003/0183691 A1 | 10/2003 | Lahteenmaki et al. |
| 2003/0191709 A1 | 10/2003 | Elston et al. |
| 2004/0005051 A1 | 1/2004 | Wheeler et al. |
| 2004/0012875 A1 | 1/2004 | Wood |
| 2004/0015418 A1 | 1/2004 | Dooley et al. |
| 2004/0041911 A1 | 3/2004 | Odagiri et al. |
| 2004/0059682 A1 | 3/2004 | Hasumi et al. |
| 2004/0080973 A1 | 4/2004 | Ogura |
| 2004/0124246 A1 | 7/2004 | Allen et al. |
| 2004/0167820 A1 | 8/2004 | Melick et al. |
| 2004/0179019 A1 | 9/2004 | Sabella et al. |
| 2004/0204082 A1 | 10/2004 | Abeyta |
| 2005/0097015 A1 | 5/2005 | Wilkes et al. |
| 2005/0109841 A1 | 5/2005 | Ryan et al. |
| 2005/0132151 A1 | 6/2005 | Kuriyama |
| 2005/0156026 A1 | 7/2005 | Ghosh et al. |
| 2005/0184164 A1 | 8/2005 | De Jong |
| 2005/0236480 A1 | 10/2005 | Vrotsos et al. |
| 2006/0032905 A1 | 2/2006 | Bear et al. |
| 2006/0049255 A1 | 3/2006 | von Mueller et al. |
| 2006/0192542 A1 | 8/2006 | Uguen |
| 2006/0223580 A1 | 10/2006 | Antonio et al. |
| 2007/0012763 A1 | 1/2007 | Van de Velde et al. |
| 2007/0067833 A1 | 3/2007 | Colnot |
| 2007/0152058 A1 | 7/2007 | Yeakley et al. |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2007/0260638 A1 | 11/2007 | Madsen et al. |
| 2008/0091617 A1 | 4/2008 | Hazel et al. |
| 2008/0189547 A1 | 8/2008 | Sugiyama |
| 2008/0191845 A1 | 8/2008 | Strzelczyk |
| 2008/0238679 A1 | 10/2008 | Rofougaran et al. |
| 2008/0245851 A1 | 10/2008 | Kowalski |
| 2008/0301030 A1 | 12/2008 | Boss et al. |
| 2008/0301050 A1 | 12/2008 | DiGioacchino |
| 2009/0006262 A1 | 1/2009 | Brown et al. |
| 2009/0020602 A1 | 1/2009 | Pratone |
| 2009/0043918 A1 | 2/2009 | Schroeder |
| 2009/0070583 A1 | 3/2009 | von Mueller et al. |
| 2009/0112768 A1 | 4/2009 | Hammad et al. |
| 2009/0132852 A1 | 5/2009 | Sekiya |
| 2009/0164326 A1 | 6/2009 | Bishop et al. |
| 2009/0283600 A1 | 11/2009 | Chang et al. |
| 2010/0057620 A1 | 3/2010 | Li et al. |
| 2010/0149196 A1 | 6/2010 | Hattori et al. |
| 2010/0224684 A1 | 9/2010 | Bonnin et al. |
| 2010/0241595 A1 | 9/2010 | Felsher |
| 2010/0243732 A1 | 9/2010 | Wallner |
| 2010/0252624 A1 | 10/2010 | Van de Velde et al. |
| 2010/0253482 A1 | 10/2010 | Catala Mora et al. |
| 2010/0287339 A1 | 11/2010 | Olszewski et al. |
| 2010/0318468 A1 | 12/2010 | Carr et al. |
| 2011/0060637 A1 | 3/2011 | Sakai et al. |
| 2011/0078034 A1 * | 3/2011 | Hayhow ............ G06Q 30/0185 |
| | | 705/21 |
| 2011/0179494 A1 | 7/2011 | Adams et al. |
| 2011/0244799 A1 | 10/2011 | Roberts et al. |
| 2011/0246371 A1 | 10/2011 | Puetsch |
| 2012/0017106 A1 | 1/2012 | Curren et al. |
| 2012/0126009 A1 | 5/2012 | Osen et al. |
| 2012/0159207 A1 | 6/2012 | Chao et al. |
| 2012/0166344 A1 | 6/2012 | Cheng et al. |
| 2012/0173817 A1 | 7/2012 | Jiang et al. |
| 2012/0185397 A1 | 7/2012 | Levovitz |
| 2012/0215830 A1 | 8/2012 | Anguiano |
| 2012/0226601 A1 | 9/2012 | Cole et al. |
| 2013/0006847 A1 | 1/2013 | Hammad et al. |

(56) References Cited

U.S. PATENT DOCUMENTS

| | | |
|---|---|---|
| 2013/0095755 A1 | 4/2013 | Moreton et al. |
| 2013/0185772 A1 | 7/2013 | Jaudon et al. |
| 2013/0248601 A1 | 9/2013 | Liang et al. |
| 2013/0299574 A1 | 11/2013 | Theobald |
| 2014/0052637 A1 | 2/2014 | Jooste et al. |
| 2014/0067675 A1 | 3/2014 | Leyva et al. |
| 2014/0127995 A1 | 5/2014 | Hendricksen et al. |
| 2014/0138438 A1 | 5/2014 | Wakao et al. |
| 2014/0189359 A1 | 7/2014 | Marien et al. |
| 2014/0217169 A1 | 8/2014 | Lewis et al. |
| 2014/0229521 A1 | 8/2014 | Meadway et al. |
| 2014/0279309 A1 | 9/2014 | Cowen et al. |
| 2014/0279520 A1 | 9/2014 | Armstrong et al. |
| 2014/0289465 A1 | 9/2014 | Suduo |
| 2014/0299664 A1 | 10/2014 | Ardis et al. |
| 2014/0331072 A1 | 11/2014 | Osen et al. |
| 2015/0106216 A1 | 4/2015 | Kenderov |
| 2015/0106648 A1 | 4/2015 | Jeon et al. |
| 2015/0282766 A1 | 10/2015 | Cole et al. |
| 2016/0117529 A1 | 4/2016 | Bedier et al. |
| 2016/0117659 A1 | 4/2016 | Bedier et al. |
| 2016/0117662 A1 | 4/2016 | Bedier et al. |
| 2016/0275478 A1 | 9/2016 | Li et al. |
| 2016/0306977 A1 | 10/2016 | Zarakas et al. |
| 2016/0307189 A1 | 10/2016 | Zarakas et al. |
| 2017/0004475 A1 | 1/2017 | White et al. |
| 2017/0028693 A1 | 2/2017 | Free et al. |
| 2017/0242961 A1 | 8/2017 | Shukla et al. |
| 2018/0005243 A1 | 1/2018 | Zovi et al. |
| 2018/0115617 A1 | 4/2018 | Kalaf et al. |
| 2018/0336756 A1 * | 11/2018 | MacKinnon ......... G07F 19/2055 |
| 2020/0051089 A1 | 2/2020 | Pi Farias et al. |

FOREIGN PATENT DOCUMENTS

| | | | |
|---|---|---|---|
| AU | 2017245444 A1 | 11/2017 | |
| CA | 2968660 A1 | 5/2016 | |
| DE | 20320080 U1 | 4/2004 | |
| EP | 0895203 A2 | 2/1999 | |
| EP | 1431861 A2 | 6/2004 | |
| EP | 1874014 A2 | 1/2008 | |
| EP | 3563328 A1 | 11/2019 | |
| FR | 2703486 A1 * | 10/1994 | ........... G06K 7/0021 |
| FR | 2812744 A1 | 2/2002 | |
| FR | 2812745 A1 | 2/2002 | |
| FR | 2834156 A1 | 6/2003 | |
| JP | H09231285 A | 9/1997 | |
| JP | 2000-030146 A | 1/2000 | |
| JP | 2000-276539 A | 10/2000 | |
| JP | 2001-222595 A | 8/2001 | |
| JP | 2002-074507 A | 3/2002 | |
| JP | 2002-123771 A | 4/2002 | |
| JP | 2002-279320 A | 9/2002 | |
| JP | 2002-352166 A | 12/2002 | |
| JP | 2002-358285 A | 12/2002 | |
| JP | 2003-108777 A | 4/2003 | |
| JP | 2003-281453 A | 10/2003 | |
| JP | 2003-308438 A | 10/2003 | |
| JP | 2004-054651 A | 2/2004 | |
| JP | 2004-062733 A | 2/2004 | |
| JP | 2004-078553 A | 3/2004 | |
| JP | 2004-078662 A | 3/2004 | |
| JP | 2004-199405 A | 7/2004 | |
| JP | 4248820 B2 | 4/2009 | |
| KR | 10-1999-0066397 A | 8/1999 | |
| KR | 10-1999-0068618 A | 9/1999 | |
| KR | 200225019 B1 | 3/2001 | |
| KR | 10-2003-0005936 A | 1/2003 | |
| KR | 10-2003-0005984 A | 1/2003 | |
| KR | 10-2003-0012910 A | 2/2003 | |
| KR | 200333809 B1 | 11/2003 | |
| KR | 10-2004-0016548 A | 2/2004 | |
| KR | 100447431 B1 | 8/2004 | |
| KR | 200405877 B1 | 1/2006 | |
| KR | 100649151 B1 | 11/2006 | |
| KR | 10-2007-0107990 A | 11/2007 | |
| KR | 100842484 B1 | 6/2008 | |
| RU | 2284578 C1 | 9/2006 | |
| WO | 1998/012674 A2 | 3/1998 | |
| WO | 2000/011624 A1 | 3/2000 | |
| WO | 2000/025277 A1 | 5/2000 | |
| WO | 01/01300 A1 | 1/2001 | |
| WO | 2001/086599 A2 | 11/2001 | |
| WO | 2002/033669 A1 | 4/2002 | |
| WO | 2002/043020 A2 | 5/2002 | |
| WO | 2002/082388 A1 | 10/2002 | |
| WO | 2002/084548 A1 | 10/2002 | |
| WO | 2003/044710 A1 | 5/2003 | |
| WO | 2003/079259 A1 | 9/2003 | |
| WO | 2004/023366 A1 | 3/2004 | |
| WO | 2006/131708 A1 | 12/2006 | |
| WO | 2009/149715 A1 | 12/2009 | |
| WO | 2013/051032 A1 | 4/2013 | |
| WO | 2013/126996 A1 | 9/2013 | |
| WO | 2015/001468 A1 | 1/2015 | |
| WO | 2016/081804 A1 | 5/2016 | |
| WO | 2017/142851 A1 | 8/2017 | |
| WO | 2018/125808 A1 | 7/2018 | |
| WO | 2018/144591 A1 | 8/2018 | |
| WO | 2018/156742 A1 | 8/2018 | |

OTHER PUBLICATIONS

"Embedded FINancial transactional IC card READer," Retrieved from the URL: https://cordis.europa.eu/project/rcn/58338/factsheet/en.

Geethapriya Venkataramani and Srividya Gopalan., "Mobile phone based RFID architecture for secure electronic payments using RFID credit cards," 2007 IEEE, (ARES'07).

"Guideline for the Use of Advanced Authentication Technology," FIPS 190, Sep. 28, 1994.

"Identification cards—Recording technique—Part 4—Location of read-only magnetic tracks—Track 1 and 2," ISO/IEC 7811-4:1995, International Organization for Standardization, Aug. 1995.

Jerome Svigals., "The Long Life and Imminent Death of the Mag-stripe Card," IEEE Spectrum, vol. 49, Issue 61, Jun. 2012.

"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing-rev1.pdf Apr. 14, 2008.

Martha E. Haykin et al., "Smart Card Technology: New Methods for Computer Access Control," NIST Special Publication 500-157, Sep. 1988.

"MSP430x1xx Family User's Guide," (including 2016 correction sheet at 2), Texas Instruments Inc., 2006.

Rueter, T., "Contactless EMV: A Work in Progress: Both EMV and contactless payment are gaining ground. Work or a single contactless EMV standard has begun, but until it is complete, the major card organizations are making their own choices", Card Technology SourceMedia, Inc (Year: 2006), pp. 1-4.

Spegele, Joseph Brain., "A Framework for Evaluating Application of Smart Cards and Related Technology Within the Department of Defense," Naval Postgraduate School, Jan. 1995.

Stephen A. Sherman et al., "Secure Network Access Using Multiple Applications of AT&T's Smart Card," AT&T Technical Journal, Sep./Oct. 1994.

* cited by examiner

LINE-BASED CHIP CARD TAMPER DETECTION

CROSS-REFERENCE TO RELATED APPLICATIONS

This application is a continuation of U.S. application Ser. No. 17/366,891, filed on Jul. 2, 2021, and entitled "LINE-BASED CHIP CARD TAMPER DETECTION," and granted as U.S. Pat. No. 11,669,842, which is a continuation of U.S. application Ser. No. 16/810,700, filed on Mar. 5, 2020, and entitled "LINE-BASED CHIP CARD TAMPER DETECTION," and granted as U.S. Pat. No. 11,113,698, which is a divisional of U.S. patent application Ser. No. 15/439,685, filed on Feb. 22, 2017, entitled "LINE-BASED CHIP CARD TAMPER DETECTION," and granted as U.S. Pat. No. 10,621,590, which applications are incorporated herein by reference.

BACKGROUND

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is inserted into corresponding EMV slot of the payment terminal, and near field communication (NFC) enabled devices such as a smartphone or EMV card that is tapped at the payment terminal and transmits payment information over a secure wireless connection. The payment terminal may receive payment information from the payment device as well information about a transaction, and may communicate this information to a payment system for processing of the transaction.

As a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

In an effort to thwart physical attacks, payment terminals may implement tamper detection devices such tamper meshes and tamper switches to identify tamper attempts. For example, if an attacker attempts to remove the cover of the payment terminal, a tamper switch may open. A tamper mesh may include a pattern of conductive traces that effectively encloses sensitive components such as the processor or other circuitry of the payment terminal. If an attacker attempts to access the sensitive components (e.g., by drilling a small hole into the payment terminal), one or more conductive traces may be broken or damaged, resulting in a change in the electrical state of the tamper mesh (e.g., by opening a circuit, closing a circuit, modifying an electrical signal's amplitude or phase, etc.). Circuitry of the payment terminal can sense the change in the electrical state of the tamper mesh to determine that a tamper attempt may have occurred and take corrective action (e.g., shut off the payment terminal) to avoid a loss of payment information. However, as attackers become more sophisticated, measures such as tamper switches or tamper meshes may be bypassed.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
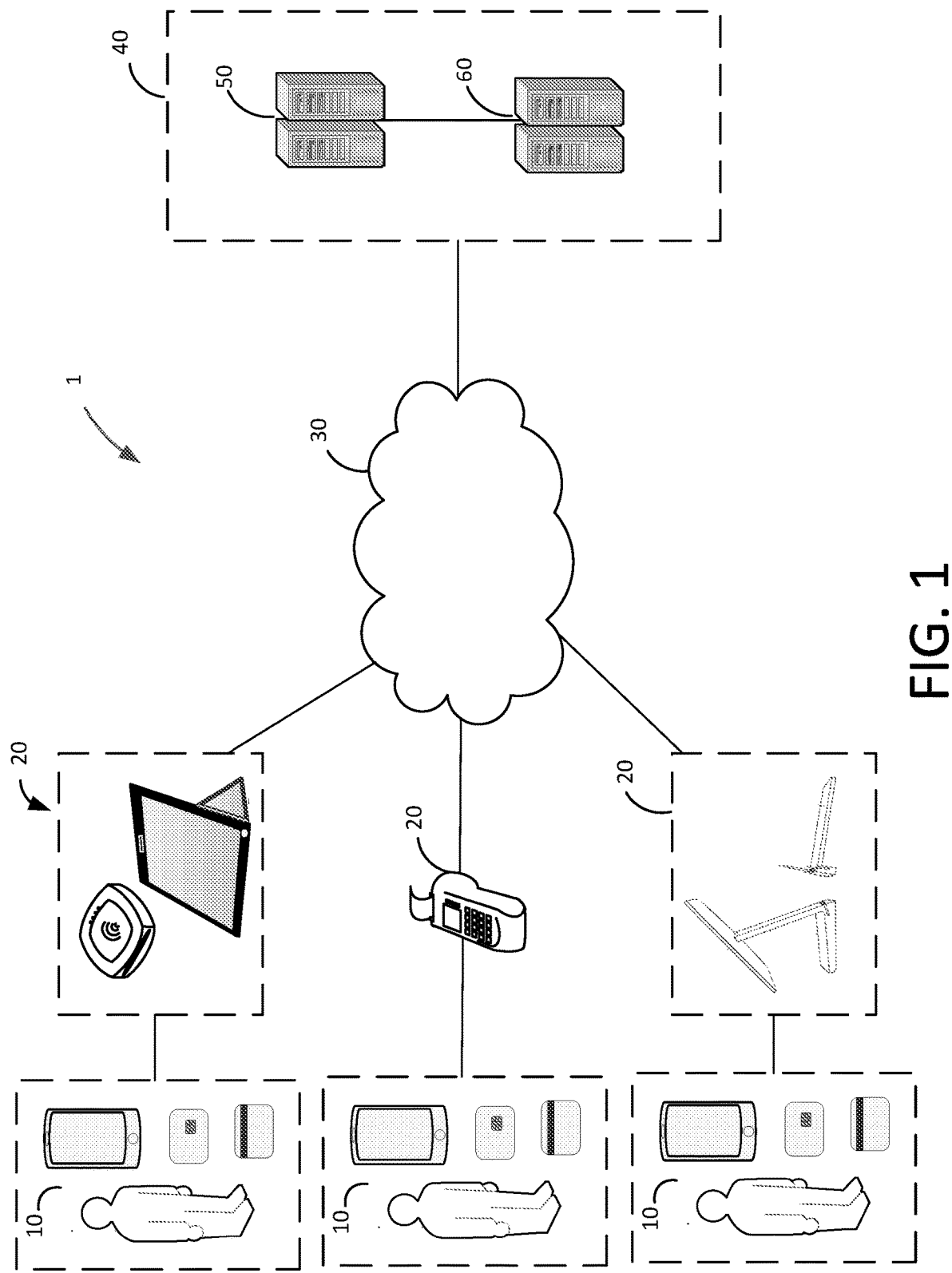
FIG. 1 shows an illustrative block diagram of a payment system in accordance with some embodiments of the present disclosure.

A payment processing device such as a payment reader or a payment terminal can implement one or more monitoring systems to detect for tamper attempts (e.g., the connection of a tamper device) at a physical interface of the payment processing device such as a chip card interface for the payment processing. The monitoring may be performed without having to install a tamper mesh inside of the payment processing device, or as an additional protection to traditional tamper detection devices. Each of the monitoring systems can establish a baseline or fingerprint for the parameters to be monitored. The baseline or fingerprint for the parameters can correspond to the state or value of the parameter when no chip card is inserted into the chip card interface. During subsequent evaluations of the chip card interface by the corresponding monitoring system, such as after processing a payment transaction, a response received by the monitoring system corresponding to the parameter that deviates from the baseline or fingerprint can indicate that a tamper attempt at the chip card interface may have occurred. If a tamper attempt is determined by a monitoring system, the monitoring system can take remedial or corrective action to limit possible damage or data access by the tamper attempt.

One monitoring system can determine a tamper attempt by detecting changes in capacitance associated with one or more components of the physical interface (e.g., pins or lines of a chip card interface). The monitoring system can periodically evaluate the chip card interface by using a capacitance measuring circuit in conjunction with an oscillator and a reference capacitor to detect changes in capacitance associated with either the pins (e.g., a power supply (VCC) pin, a reset (RST) pin, a clock (CLK) pin, an input output (I/O) pin, a ground (GND) pin, and programming voltage (VPP) pin) or lines connected to the pins of the chip card interface. The capacitance measuring circuit can measure the change in capacitance values for each pin and/or line being monitored and analyze the results to determine a tamper attempt. A tamper attempt can be identified when a change in capacitance detected by the capacitance measuring circuit deviates by more than a threshold from the corresponding baseline for the pin or line of the chip card interface. The change in capacitance can indicate that a tamper attempt, such as the connection of a wire, has occurred at a pin or line of the chip card interface which resulted in the different capacitance determination.

Another monitoring system can determine a tamper attempt by using time domain reflectometry (TDR) to identify unexpected or additional reflections occurring at different times in the TDR response to a pulse. The monitoring system can periodically evaluate the physical interface (e.g., chip card interface) by using a transmitter to send a pulse on one or more of the lines coupled to the chip card interface. The reflections from the pulse can be detected by a detector and analyzed to determine a tamper attempt. A tamper attempt can be identified when the reflections detected by the detector include unexpected or additional reflections occurring at different times from the corresponding baseline set of reflections for the line of the chip card interface. The additional reflections can indicate that a tamper attempt, such as the connection of a wire, has occurred at the chip card interface which has caused the corresponding additional reflections to be detected.

A further monitoring system can determine a tamper attempt by identifying changes in the internal physical configuration of the physical interface (e.g., chip card interface). The monitoring system can periodically evaluate the chip card interface by using a transmitter to emit an audio or light signal directed towards the chip card interface. The reflections from the transmitted signal can be detected by a detector and analyzed to determine a tamper attempt. A tamper attempt can be identified when the reflections detected by the detector deviate by more than a threshold from the corresponding baseline configuration for the chip card interface. The change in the reflections resulting in a new configuration can indicate that a tamper attempt, such as the connection of a wire, has occurred at the chip card interface which has caused the detected reflections to change.

The payment processing device can also implement a monitoring system at the I/O pin of the physical interface (e.g., chip card interface) for the payment processing device to detect for tamper attempts (e.g., the connection of a tamper device) and to alter the data transmission sequence between the chip card and the payment processing device. By altering the data transmission sequence, the monitoring system can conceal the data being extracted by a tamper device in order to make interpretation of the extracted data difficult for the tamper device. In one embodiment, the monitoring system can send a reset signal to a reset pin of the chip card interface during a data transmission by the chip card in order to restart the data transmission process. If the tamper device is only extracting data from the I/O pin, the tamper device will be unaware that some of the data has been resent thereby making it more difficult for the tamper device to interpret the extracted data. In another embodiment, the monitoring system can operate reading circuitry for the payment processing device circuitry at a higher frequency than transmit circuitry used to send data from the chip card. Due to the discrepancy in frequency between transmitting data and reading data, the reading of the data can be completed in advance of the next transmission of data. While waiting for the next transmission of data, the monitoring system can send bogus data over the I/O pin. If the tamper device is only extracting data from the I/O pin, the tamper device will be unaware that some of the data at the I/O pin is bogus data thereby making it more difficult for the tamper device to interpret the extracted data.

An additional monitoring system may include components to be monitored (e.g., of the contact interface) located upon a printed circuit board. The printed circuit board may include an array of touch sensors located at critical locations of the printed circuit board (e.g., pins, connectors, and lines for the contact interface), or in some embodiments, as a layer overlaying the entire PCB. Although any suitable touch sensor may be used, in an embodiment, the touch sensor may be a capacitive touch sensor. In an embodiment, a baseline capacitance may be determined within a trusted environment such as a manufacturing or service environment and stored in memory. This baseline may be adjusted based on factors such as Any measurements on the touch sensor that differ from this baseline by more than a threshold or in a pattern that is associated with a tamper may be determined to be a tamper attempt. The baseline, thresholds, and patterns may be adjusted based on factors such as temperature, physical location, humidity, or altitude.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. The components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
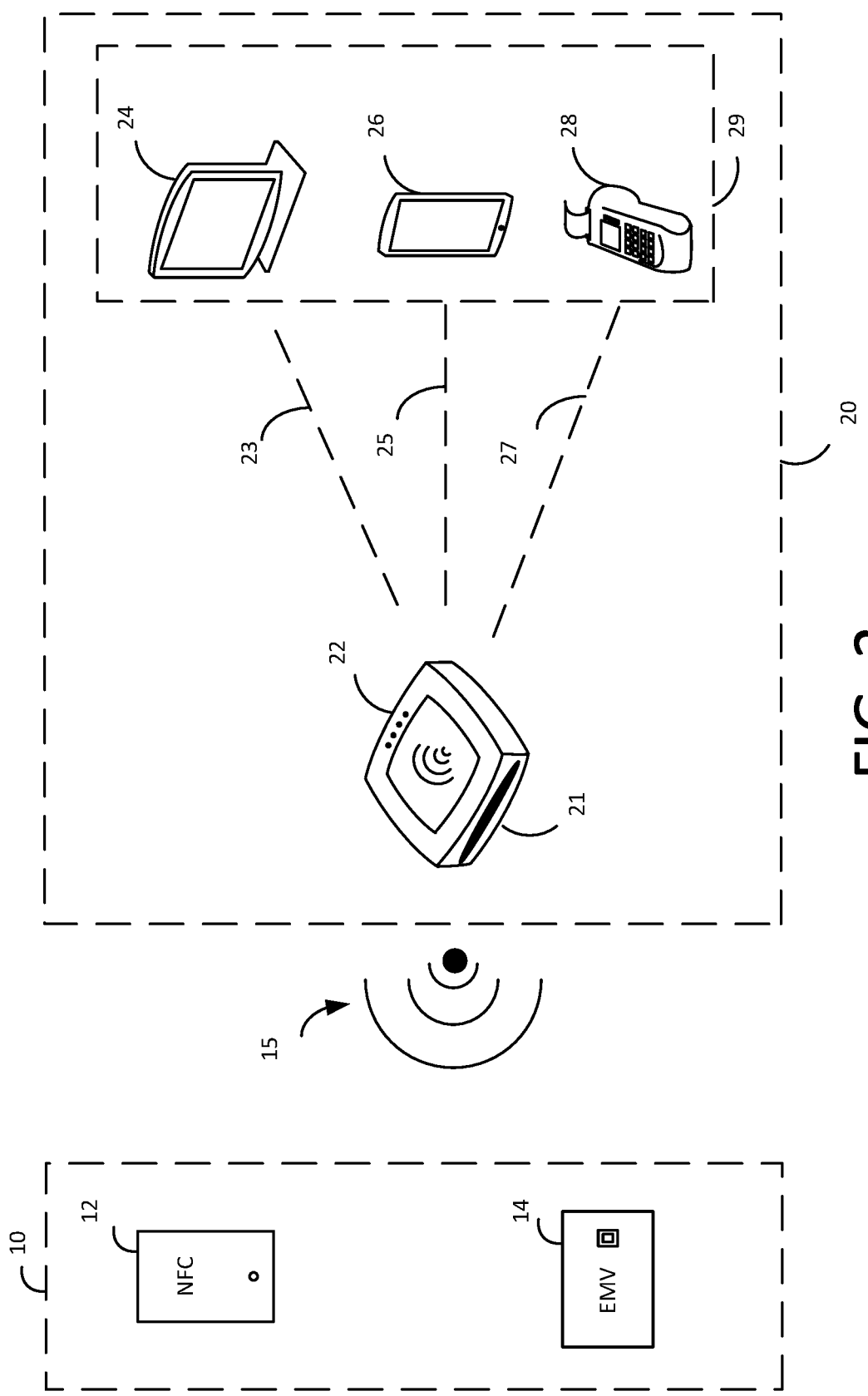
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may incorporate a payment reader 22 and a merchant device 29. However, it will be understood that as used herein, the term payment terminal may refer to any suitable component of the payment terminal 20, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 executes a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g., by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
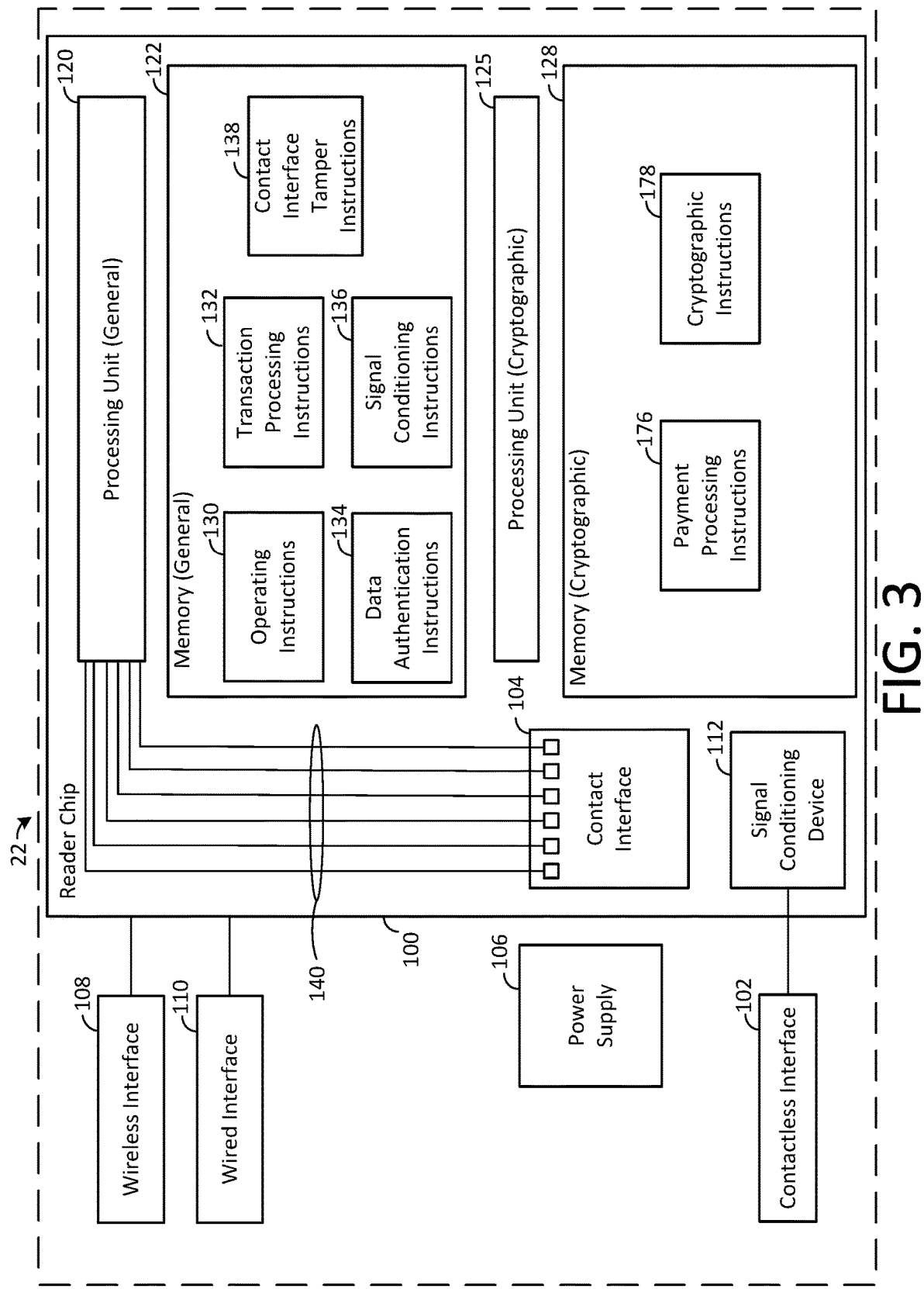
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may communicate with an interactive electronic device such as a merchant device 29 via wireless (e.g., using Bluetooth classic or Bluetooth low energy) or wired (e.g., using USB connectors) connections. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner.

In one embodiment, payment reader 22 includes a reader chip 100, a plurality of payment interfaces (e.g., a contactless interface 102 and a contact interface 104), a power supply 106, a wireless communication interface 108, a wired communication interface 110, and a signal conditioning device 112. Payment reader 22 (e.g., reader chip 100 of payment reader 22) may also include a general processing unit 120 (e.g., a terminal/reader processing unit), general memory 122, a cryptographic processing unit 125, and cryptographic memory 128. Although in one embodiment the processing units and memories will be described as packaged in a reader chip 100, and configured in a particular manner, it will be understood that general processing unit 120, general memory 122, a cryptographic processing unit 125, and cryptographic memory 128 may be configured in any suitable manner to perform the functionality of the payment reader 22 as is described herein. It will also be understood that the functionality of reader chip 100 may be embodied in a single chip or a plurality of chips, each including any suitable combination of processing units and memory to collectively perform the functionality of reader chip 100 described herein.

In some embodiments, processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may execute software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry (not depicted) such as interface circuitry, analog front-end circuitry, security circuitry, and monitoring component circuitry. In one embodiment, the interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, Fire-Wire, and Lightning), circuitry for interfacing with other communication interfaces or buses (e.g., I$^2$C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to the processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (i.e., general memory 122 and cryptographic memory 128). In this manner, specific cryptographic processing and critical security information (e.g., cryptographic keys, passwords, user information, etc.) may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 also may include analog front end circuitry for interfacing with the analog components of contactless interface 102 (e.g., electromagnetic compatibility (EMC) circuitry, matching circuitry, modulation circuitry, and measurement circuitry.

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (shown coupled to general processing unit 120 by connections 140) for physically interfacing with the chip card 14 according to EMV specifications. In one embodiment, connections 140 can include power lines, data lines and ground lines. However, in other embodiments, other suitable types of connections can be used with the contact pins. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When the power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a device which may include a processing unit (not depicted) and memory (not depicted).

Wired communication interface 110 may include any suitable interface for wired communication with other devices or a communication network, such as USB, Lightning, FireWire, Ethernet, any other suitable wired communication interface, or a suitable combination thereof. In some embodiments, wired communication interface 110 may allow payment reader 22 to communicate with one or both of merchant device 29 and payment server 40.

In some embodiments, reader chip 100 may include a signal conditioning device 112. Although signal conditioning device 112 may include any suitable hardware, software, or any combination thereof, in an exemplary embodiment signal conditioning device 112 may include an FPGA. Signal conditioning device 112 may receive and condition signals sent from contactless interface 102, such as when a payment device 10 using NFC communication communicates with payment reader 22.

In some embodiments, general memory 122 may be a suitable memory as described herein, and may include a plurality of sets of instructions for controlling operations of payment reader 22 and performing general transaction processing operations of payment reader 22, such as operating instructions 130, transaction processing instructions 132, data authentication instructions 134, signal conditioning instructions 136, and contact interface tamper instructions 138.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing instructions stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include suitable information such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Signal conditioning instructions 136 may include instructions for conditioning signals received from a payment device 10 via the contactless interface 102 (e.g., from a NFC payment device 12). Although in some embodiments, signal conditioning instructions 136 may include instructions for manipulating signals received via contactless interface 102, signal conditioning instructions 136 may include instructions for conditioning signals, including signals that are initially processed by signal conditioning hardware, such as signal conditioning device 112.

Contact interface tamper instructions 138 may include instructions for detecting a tamper attempt at the contact interface 104 and/or for concealing data extracted by a tamper device. Although the contact interface tamper instructions 138 will be described herein as providing functionality for testing of tamper attempts at a contact interface, it will be understood that similar instructions and monitoring components may be employed to perform tamper monitoring of other physical interfaces of a suitable device requiring security at various physical interfaces (e.g., sensitive communications technology, banking equipment, customer kiosks, etc.). The contact interface tamper instructions 138 can generate a fingerprint or baseline for one or more parameters and/or configurations of the contact interface 104. The fingerprint or baseline can be based on a capacitance value associated with one or more components of the contact interface 104, the number of reflections returned from the transmission of a pulse on a line of the contact interface 104, and/or a physical internal configuration of the contact interface 104. The contact interface tamper instructions 138 can then perform subsequent (e.g., after completing a payment transaction) measurements and/or determinations of the same parameters and compare the subsequent measurements and determinations to the fingerprint or baseline to detect for a tamper attempt (e.g., the connection of a tamper device). If the fingerprint and subsequent measurements and/or determinations do not correspond, a determination can be made that a tamper attempt has occurred. The contact interface tamper instructions 138 can implement remedial measures, such as powering off the payment reader 22, in response to the determination that a tamper attempt has occurred.

In addition, the contact interface tamper instructions 138 can also be used to conceal payment information and other data communicated between a chip card 14 and the payment reader 22. The contact interface tamper instructions 138 can provide bogus data or alter the data transmission process such that a connected tamper device is not able to effectively interpret the extracted data from the payment reader 22. The concealing of data can be continuously performed in anticipation of a tamper device being connected to the payment reader 22. Alternatively, the concealing of data can be performed in response to a determination that a tamper attempt has occurred.

In some embodiments, contact interface tamper instructions 138 may include instructions for identifying tamper attempts and other attacks on a payment reader 22. Although contact interface tamper instructions 138 may perform any suitable operations when executed by processing unit 120, in some embodiments, contact interface tamper instructions 138 may operate monitoring systems, process monitoring signals received from the monitoring systems, monitor messages exchanged with an EMV chip card 14, identify tampering based on local test criteria, communicate information that relates to tampering to a payment server 40 (e.g., payment service system 50), receive tamper determination messages from a payment server 40 (e.g., payment service system 50), and take corrective action based on the local test criteria and the tamper determination messages.

In some embodiments, contact interface tamper instructions 138 may include instructions for operating monitoring systems. As described herein, a variety of types of monitoring systems may be utilized in accordance with the present disclosure. Contact interface tamper instructions 138 may provide instructions to control signals provided to monitoring systems of reader chip 100, for example, to provide power, test signals, and other suitable signals to the monitoring systems. In some embodiments, contact interface tamper instructions 138 may provide instructions to control communication with one or more monitoring systems, to provide control messages, receive data, or perform any other suitable functions with the monitoring systems. In some embodiments, operating the monitoring components may include providing signals such as test signals or test waveforms to one or more of the monitoring systems. For example, in one embodiment a test pulse may be provided to the connection 140 coupled to the I/O interface 208 of the contact interface 104 via monitoring system 450 (see FIG. 9).

In some embodiments, contact interface tamper instructions 138 may provide instructions to process monitoring signals received from the monitoring systems. Monitoring signals may be received at reader chip 100 (e.g., via monitoring component circuitry) in a variety of forms, including analog signals, digital signals, and data signals. Contact interface tamper instructions 138 may provide instructions for processing unit 120 to extract useful data from the received monitoring signals. In some embodiments, extracting useful data may include measuring some aspect of the monitored signal, such as voltage, current, impedance, capacitance, power, energy, waveform shape, etc. In an embodiment, monitoring system 550 (see FIG. 14) may receive and monitor the analog signal on the connection 140 coupled to the I/O interface 208 of the contact interface 104, thus monitoring an output signal transmitted by the reader chip 100 and an input signal received via contact interface 104 during EMV communications. In some embodiments, the monitored signal may be digital or may be converted into a digital signal by an analog-to-digital converter. In some embodiments, contact interface tamper instructions 138 may provide instructions for communicating with a monitoring system by exchanging data, for example, by communicating with monitoring components such as sensors over a data line or communication bus.

In some embodiments, contact interface tamper instructions 138 may provide instructions to monitor messages exchanged with a payment device 10. For example, messages may be exchanged with an EMV chip card 14 via contact interface 104. Processing unit 120 may generate and receive the messages and contact interface tamper instructions 138 may include instructions for monitoring the messages and aspects of those messages, such as their content, sequence, completion and timing. In some embodiments, the messages may be monitored along with information received from one or more of the monitoring systems. For example, the timing of messages that are sent and received over the connection 140 coupled to the I/O interface 208 of contact interface 104 may be determined based on a monitored signal received from monitoring system 550 (see FIG. 14).

In some embodiments, contact interface tamper instructions 138 may provide instructions to identify fraud or tampering based on local test criteria. Although fraud or tampering may be identified based on any suitable information, in some embodiments fraud or tampering may be identified based on monitored signals acquired from the monitoring systems, monitored responses, monitored timing, or any combination thereof. Local test criteria may be criteria such as thresholds or logical tests that are available to run locally at the payment terminal 20 that is interfacing with the payment device 10 (e.g., at a payment reader 22 that interfaces with NFC device 12 or chip card 14). Local test criteria may allow the payment terminal to respond quickly to certain types of fraudulent transactions and tamper attempts, without having to communicate with another device such as a payment server 40 (e.g., a payment service system 50).

In some embodiments, local test criteria may be updated (e.g., by insertion of a memory device into a port of the payment terminal 20, receiving an update message over a network, or any other suitable manner for providing updates). Processing unit 120 may receive the update and update the local test criteria by modifying the contact interface tamper instructions 138. Local test criteria may also change based on local conditions, which may be determined based on any suitable inputs (e.g., time, location, presence of a network connection, etc.). For example, the local test criteria may be modified (e.g., strengthened) if a payment terminal 20 is not connected to a network, and thus cannot communicate with a payment server 40 to receive fraud determination messages.

Another exemplary local test criteria may be an electrical characteristics test. A tamper device may impact electrical signals of a payment terminal 20 (e.g., payment reader 22) or may produce electrical signals that are different from expected electrical signals. For example, electrical characteristics (e.g., voltage, current, impedance, capacitance, power, energy) of any of the pins of the contact interface 104 (e.g., the VCC pin, GND pin, RST pin, CLK pin, VPP pin, and I/O pin) may be determined from a monitoring system such as monitoring system 400 shown in FIG. 7. In some embodiments, a test waveform may be transmitted to one or more of these pins. One or more of the electrical characteristics may be compared to a range or threshold, and in some embodiments, statistics may be calculated from the electrical characteristics. The comparison or statistics may be used to identify a fraud or tamper attempt. For example, in an embodiment the monitoring system 400 may monitor the connection 140 coupled to the I/O interface 208 of contact interface 104. An analog monitoring signal provided by the monitoring system 400 may be converted to a digital signal (e.g., using an analog-to-digital converter). Processing unit 120 of reader chip 100 may analyze the waveform (e.g., shape, duty cycle, rise time, fall time, frequency, phase, etc.) of the digitized I/O line signal based on ranges or thresholds from the fraud/tamper instructions 138 to determine whether there is likely to be a tamper device at the contact interface 104.

In some embodiments, contact interface tamper instructions 138 may provide instructions that cause a payment terminal 20 (e.g., payment reader 22 of payment terminal 20) to communicate information that relates to fraud or tampering to a payment server 40 (e.g., payment service system 50, via merchant device 29 and network 30). As described herein, a payment terminal 20 may determine electrical characteristics based on signals and data received from monitoring systems. In some embodiments, local test criteria may be used to determine fraud or a tamper attempt locally at the payment terminal 20. In some embodiments, some or all of the fraud and tamper detection may be performed remotely from the payment terminal 20 (e.g., the payment reader 22). Thus, in some embodiments a server request message may be generated and sent to the payment server 40 (e.g., payment service system 50). The server request message may include any suitable information, such as monitored electrical characteristics, monitored timing, monitored responses, statistics determined therefrom, transaction information, information about the payment terminal (e.g., location, etc.), environmental information (e.g., temperature, etc.), preliminary assessments based on local test criteria, or any suitable combination thereof. In some embodiments, the server request message may only be sent if the local test criteria indicate that there is likely to be a fraudulent transaction or tamper attempt, for a subset of local test criteria, or based on the severity of a possible fraudulent transaction or tamper attempt.

In some embodiments, contact interface tamper instructions 138 may provide instructions to receive fraud determination messages from a payment server 40 (e.g., payment service system 50). As described herein, a payment server 40 (e.g., payment service system 50) may utilize the information provided in server request messages to determine whether a fraudulent transaction or tamper attempt is occurring, and may respond with a fraud determination message (e.g., by transmitting the fraud determination message to payment reader 22 via network 30 and merchant device 29). Contact interface tamper instructions 138 may cause processing unit 120 of reader chip 100 to extract information from the fraud determination message, such as an indication that a fraudulent transaction or tamper attempt is occurring, information about the type of fraudulent transaction or tamper attempt, and instructions regarding a type of corrective action to perform.

In some embodiments, contact interface tamper instructions 138 may provide instructions for taking corrective action based on the local test criteria and the fraud determination message. Although any suitable corrective action may be taken, in some embodiments corrective action may include aborting a transaction (e.g., ceasing communications with a payment device 10), temporarily or permanently removing power or disabling one or more components of the payment terminal 20 (e.g., using tamper protection circuitry, security circuitry, or electronic fuses), querying the payment device 10 (e.g., sending request messages) to gather additional information about the fraudulent transaction or tamper attempt, or employing countermeasures (e.g., utilizing security circuitry to switch a high current to the connection 140 coupled to the I/O interface 208 of the payment device 10 via contact interface 104) in an attempt to damage the tamper device.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Figure 4:
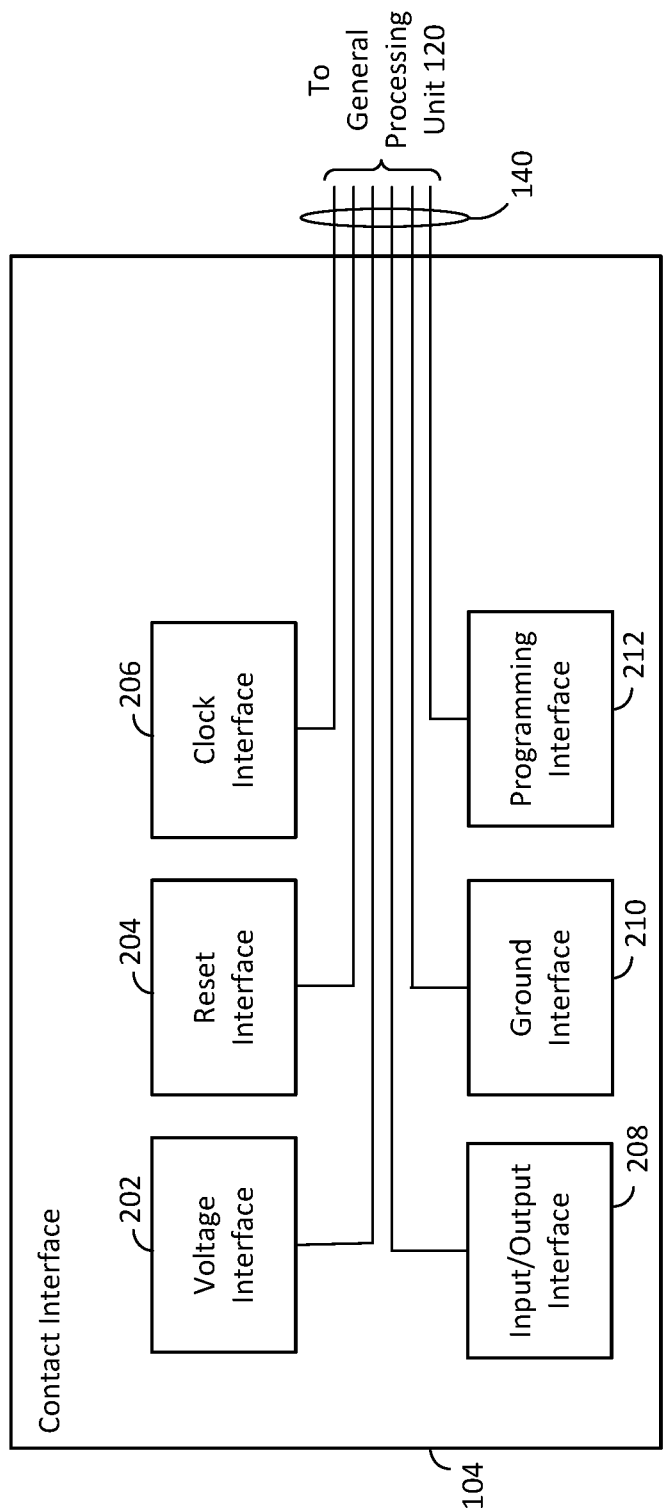
FIG. 4 depicts an illustrative block diagram of certain components of a contact interface for a payment reader in accordance with some embodiments of the present disclosure.

FIG. 4 depicts an illustrative block diagram of certain components of a contact interface 104 for a reader chip 100 in accordance with some embodiments of the present disclosure. In an embodiment, at least some of the components of contact interface 104 depicted in FIG. 4 may operate to permit the reader chip 100 of the payment reader 22 and the chip card 14 to exchange data and/or information such as payment information. Although particular components are depicted in the particular arrangement of FIG. 4, it will be understood that the contact interface 104 may include additional components, one or more of the components depicted in FIG. 4 may not be included in the contact interface 104, and the components of the contact interface 104 may be rearranged in a suitable manner. In an embodiment, the contact interface 104 includes at least a voltage interface 202, a reset interface 204, a clock interface 206, an input/output interface 208, a ground interface 210, and a programming interface 212.

The voltage interface 202 may include a power supply (VCC) pin. The reset interface 204 may include a reset (RST) pin for resetting a chip card 14. The clock interface 206 may include a clock (CLK) pin for providing a clock signal. The input/output interface 208 may include an input output (I/O) pin for providing for communications with the chip card 14. The ground interface 210 may include a ground (GND) pin. The programming interface 212 may include a programming voltage (VPP) pin for providing a programming voltage to a chip card 14. In other embodiments, contact interface 104 may include additional pins such as two auxiliary pins (not depicted in FIG. 4).

Figure 5:
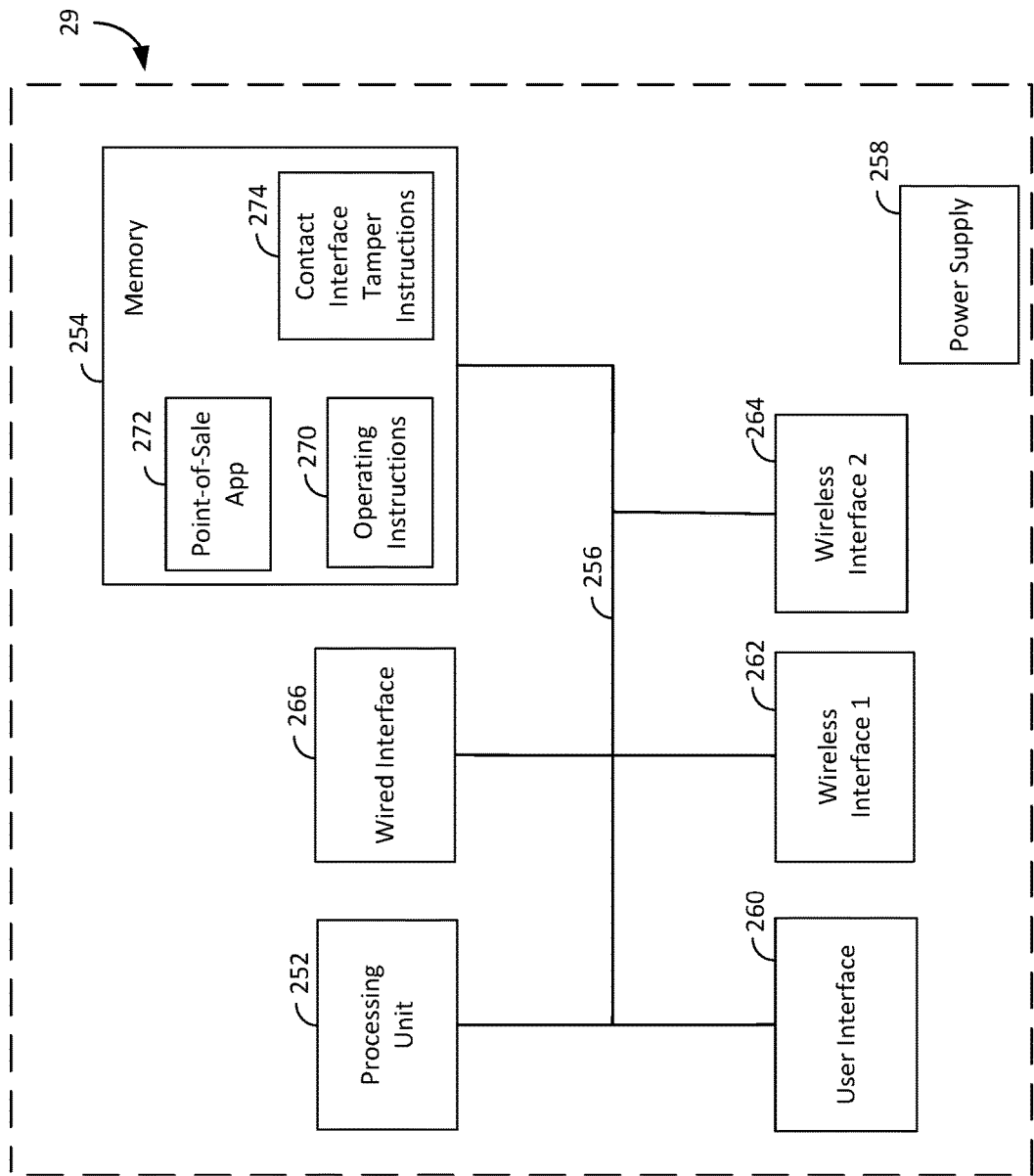
FIG. 5 depicts an illustrative block diagram of a merchant device in accordance with some embodiments of the present disclosure.

FIG. 5 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 5, it will be understood that merchant device 29 may include additional components, one or more of the components depicted in FIG. 5 may not be included in merchant device 29, and the components of merchant device 29 may be rearranged in any suitable manner. In one embodiment, merchant device 29 includes a processing unit 252, a memory 254, an interface bus 256, a power supply 258, a user interface 260, a first wireless interface 262, a second wireless interface 264, and a wired interface 266.

In one embodiment, the merchant device 29 includes a processing unit 252 and memory 254 that are configured to control and perform the necessary operations of the merchant device 29. In one embodiment, the processing unit 252 of may be a general purpose processor running instructions for a mobile operating system, programs, and applications based on instructions that may be stored in memory 254. The memory 254 may include any suitable memory types or combination thereof as described herein, such as flash memory and RAM memory, for storing instructions and other data and providing a working memory for the execution of the operating system, programs, and applications of the merchant device 29. In one embodiment, the memory may include a plurality of sets of instructions, such as operating instructions 270, point-of-sale application instructions 272, and contact interface tamper instructions 274.

The processing unit 252 may execute the instructions of memory 254 to interact with and control one or more other components of the merchant device 29. Although the processing unit 252 may communicate with other components of the merchant device 29 in any suitable manner, in one embodiment the processing unit may utilize an interface bus 256. Interface bus 256 may include one or more communication buses such as I2C, SPI, USB, UART, and GPIO. In one embodiment, the processing unit 252 may execute instructions of the memory and based on those instructions may communicate with the other components of the merchant device 29 via the communication buses of interface bus 256.

Merchant device 29 may also include a power supply 258. Power supply 258 may include power conversion circuitry for converting AC power and/or generating a plurality of DC voltages for use by components of merchant device 29. When power supply 258 includes a battery, the battery may be charged via a physical power connection, via inductive charging, or via any other suitable method. Although not depicted as physically connected to the other components of merchant device 29 in FIG. 4, power supply 258 may supply a variety of voltages to the components of merchant device 29 in accordance with the requirements of those components.

Merchant device 29 may also include a user interface 260. User interface 260 may provide various options for the user of the merchant device 29 to interact with applications and programs running on the merchant device 29. An exemplary user interface 260 may include hardware and software for any suitable user interface, such as a touchscreen interface, voice command interface, keyboard, mouse, gesture recognition, any other suitable user interface, or any combination thereof. In one embodiment, the user interface 260 may be a touchscreen interface that displays an interactive user interface for programs and applications such as a point-of-sale application running on the merchant device 29, and provides prompts and displays related to tamper attempts and corrective actions.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. A first wireless communication interface 262 may be a wireless communication interface that primarily communicates with payment reader 22 (e.g., a Bluetooth classic and/or Bluetooth low energy interface) while a second wireless communication interface 264 may be a wireless communication interface (e.g., WiFi) that primarily communicates with a payment service system 50 of payment server 40 (e.g., via the Internet).

Merchant device may also include a wired interface 266, which may include any suitable interface for wired communication with other devices or a communication network, such as USB, Lightning, FireWire, Ethernet, any other suitable wired communication interface, or any combination thereof.

Memory 254 may include a plurality of sets of instructions for performing the processing operations of merchant device 29, such as operating instructions 270, point-of-sale application instructions 272, contact interface tamper instructions 274, and any other suitable instructions for operating the merchant device 29 (e.g., instructions related to the operation of one or more other applications or components of the merchant device 29).

Operating instructions 270 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 270 may include instructions for controlling the operations of the user interface 260. The user interface may be controlled in accordance with the instructions of programs and applications of the operating instructions 270, point-of-sale application instructions 272, and the contact interface tamper instructions 274. In one embodiment, the point-of-sale application instructions 272 may include instructions to display notices of fraudulent transactions and tamper attempts, and to display a menu or other selection option in order to choose a corrective action to be taken by a payment reader 22. The user interface 260 may display the menu or other selection option based on the operating instructions 270 executed by processing unit 252.

Operating instructions 270 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions.

Point-of-sale application instructions 272 include instructions for running a point-of-sale application on the merchant device 29. When executed by the processing unit 252, the point-of-sale application instructions 272 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions may include instructions for providing a rich display of information relating to fraudulent transactions and tamper attempts, and options for selection of corrective action to take in response to fraudulent transactions and tamper attempts.

Contact interface tamper instructions 274 may include any suitable instructions for assisting with fraud and tamper detection, including instructions for offloading a portion of the testing from payment reader 22, providing options for a user interface for controlling operations of payment reader 22, and communications with a payment server 40 (e.g., a payment service system 50). In some embodiments, merchant device 29 may perform some or all of the local analysis (e.g., based on the local test criteria) of information (e.g., monitored responses, monitored timing, and electrical characteristics, environmental information, payment reader information) received from payment reader 22. In this manner, payment reader 22 may require less processing capability, or in some embodiments, more complex analysis may be performed at merchant device 29.

Contact interface tamper instructions 274 may include instructions for merchant device 29 (or an integrated payment terminal 20) to provide an interface to respond to potential fraudulent transactions or tamper attempts. In some embodiments, a display may be generated for the user interface that provides information such as a warning of a tamper attempt, and in some embodiments, options to override the warning and process the transaction. Other user interface information may include instructions for handling of the fraudulent transaction or tamper attempt. In some embodiments, user interface information may include an interface for modifying local test criteria, the selection of test criteria to be performed at payment reader 22, the assignment of different forms of corrective action to different types of fraudulent transactions or tamper attempts, any other suitable user interface information, or any suitable combination thereof.

Figure 6:
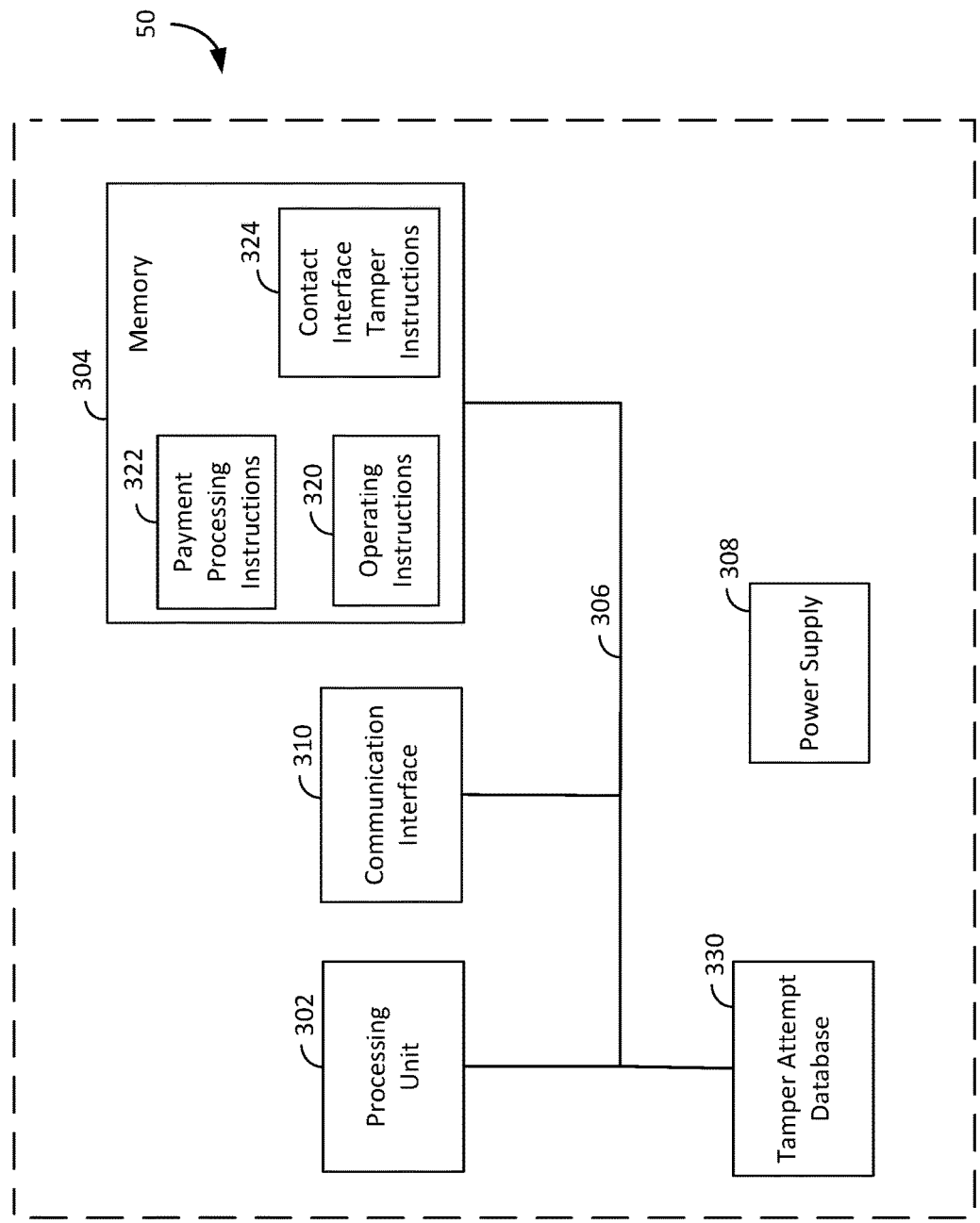
FIG. 6 depicts an illustrative block diagram of a payment service system in accordance with some embodiments of the present disclosure.

FIG. 6 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 6, it will be understood that the payment service system 50 may include additional components, one or more of the components depicted in FIG. 5 may not be included in the payment service system 50, and the components of payment service system 50 may be rearranged in any suitable manner. In one embodiment, payment service system 50 includes at least a processing unit 302, a memory 304, an interface bus 306, a power supply 308, a communication interface 310, and a tamper attempt database 330.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, and contact interface tamper instructions 324.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I2C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 5, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments the communication interface 310 may utilize higher speed communication interfaces such as WiFi, cellular, Ethernet, or fiber optics. The communication interface may establish a secured connection (e.g., via TLS or SSL) with a payment terminal 20 (e.g., payment reader 22 via merchant device 29) in order to exchange messages relating to payments and potentially fraudulent transactions or tamper attempts (e.g., server request messages and fraud determination messages). The communication interface may also communicate with other servers of the payment server 40 such as transaction processing servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application. Transaction processing servers may be associated with and operated by one or more of the merchant, issuer, or customer banks.

Memory 304 may include a plurality of sets of instructions for performing the processing operations of the payment service system 50, such as operating instructions 320, payment instructions 322, contact interface tamper instructions 324, and any other suitable instructions for operating the payment service system 50 (e.g., instructions related to the operation of one or more other applications or components of the payment service system 50).

Operating instructions 320 may include instructions for controlling any suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50.

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or transaction processing servers. In one embodiment, the payment processing instructions may include information about each payment reader 22 and merchant device 29 having an installed point-of-sale application. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations). Payment processing instructions 332 may also include instructions for accessing encryption keys such as a shared private key or a key of a public/private key pair for encrypting and decrypting data provided by one or more of a payment device 10, payment reader 22, or merchant device 29.

Contact interface tamper instructions 324 include instructions for identifying fraudulent transactions or tamper attempts based on communications received from payment terminal 20 (e.g., from a payment reader 22 via merchant device 29 and network 30), providing messages to payment terminal 20, logging data (e.g., electrical characteristics, monitored responses, monitored timing, environmental data, payment reader information, etc.) received from the payment terminal 20 to tamper attempt database 330, and analyzing data stored in tamper attempt database 330 to identify and update test criteria.

Contact interface tamper instructions 324 may provide instructions for payment service system 50 to receive and process messages (e.g., a server request message) from payment terminal 20 (e.g., from payment reader 22 via merchant device 29, network 30, and communication interface 310). The received messages may include information such as monitored electrical characteristics, monitored timing, monitored responses, information about the payment terminal (e.g., location, model, paired merchant devices, etc.), environmental information (e.g., temperature, etc.), statistics determined therefrom, and preliminary assessments based on local test criteria. The information may be compared to server test criteria to determine whether a fraudulent transaction or tamper attempt is occurring. In some embodiments the server test criteria may include the test criteria described above with respect to the local test criteria, as well as additional test criteria involving comparisons with related transactions, concurrent transactions, previous transactions, and feedback information. In some embodiments, server test criteria may be dynamic (e.g., utilizing dynamic thresholds) such that they may be regularly updated based on recent data acquired from payment terminal 20 and other payment terminals 20. The server test criteria may also involve a comparison to similar data from other concurrent or recent tamper attempts, which may allow for detection of patterns of tamper attempts that may not be readily identified at a single payment terminal (e.g., if a large percentage of recent tamper attempts have similar electrical characteristics, monitored timing, payment terminal characteristics, environmental information, or monitored messages).

Contact interface tamper instructions 324 may provide instructions for payment service system 50 to provide messages to payment terminal 20 (e.g., via fraud determination messages). Once payment service system 30 has determined whether a transaction is fraudulent or if a tamper attempt is occurring, a fraud determination message may be generated. The fraud determination message may include information such as an indication that a fraudulent transaction or tamper attempt is occurring, information about the type of fraudulent transaction or tamper attempt, and instructions regarding a type of corrective action to perform. The fraud determination message may then be transmitted to the payment terminal 20.

Contact interface tamper instructions 324 may provide instructions for logging data (e.g., electrical characteristics, monitored responses, monitored timing, payment terminal information, environmental data, etc.) received from the payment terminal 20 to tamper attempt database 330. In addition to data received from payment terminal 20, any other suitable information such as the results of server test criteria and suggested corrective action may be stored in the tamper attempt database 330.

Contact interface tamper instructions 324 may provide instructions for analyzing data stored in tamper attempt database 330. Tamper attempt database 330 may include a large store of tamper attempt information. The information stored in tamper attempt database 330 includes any suitable information such as electrical characteristics, monitored timing, monitored responses, payment terminal information, environmental data, indications of whether a tamper attempt has occurred, and a type of corrective action.

In addition, it may be determined by other electronic systems (e.g., a bank server 60) or by other methods (e.g., business or consumer reporting of tamper attempts) that tamper attempts were not captured by payment reader 22 (e.g., by the local test criteria) or payment server 50 (e.g., by the server test criteria). Such transactions may be referred to as false negatives. It may also be determined by other electronic systems (e.g., a bank server 60) or by other methods (e.g., business or consumer reporting of tamper attempts) that transactions were improperly denied by payment reader 22 (e.g., by the local test criteria) or payment server 50 (e.g., by the server test criteria). Such transactions may be referred to as false positives. The false positives and false negatives may provide feedback that may be associated with the information for a transaction and stored in transaction database 330, based on contact interface tamper instructions 324.

It may also be determined by other electronic systems (e.g., a bank server 60) or by other methods (e.g., business or consumer reporting of tamper attempts) that new or modified methods of engaging in fraudulent transactions or tamper attempts are being performed, and criteria for these may be provided to payment service system. Such criteria may provide feedback that is referred to as externally updated criteria. Local test criteria and server test criteria may be updated based on these externally updated criteria and contact interface tamper instructions 324.

Although analysis of the data stored at tamper attempt database 330 may be performed in any suitable manner, in some embodiments machine learning techniques may be used to analyze the data. It will be understood that the availability of this large volume of information relevant to fraudulent transactions and tamper attempts enables complex analyses that improve the responsiveness of the payment processing system. By fine tuning server test criteria and local test criteria, the test criteria can be dynamically calibrated to avoid false positives (e.g., false determinations that a transaction is fraudulent or that a tamper attempt is occurring) while capturing new types of attacks or improved attacks. Payment service system 50 may determine that certain data captured by payment terminal 20 is highly likely to be the result of a fraudulent transaction or tamper attempt, and generate local test criteria accordingly. The local test criteria may then be updated via an update message. Payment service system may similarly update the server test criteria.

Figure 7:
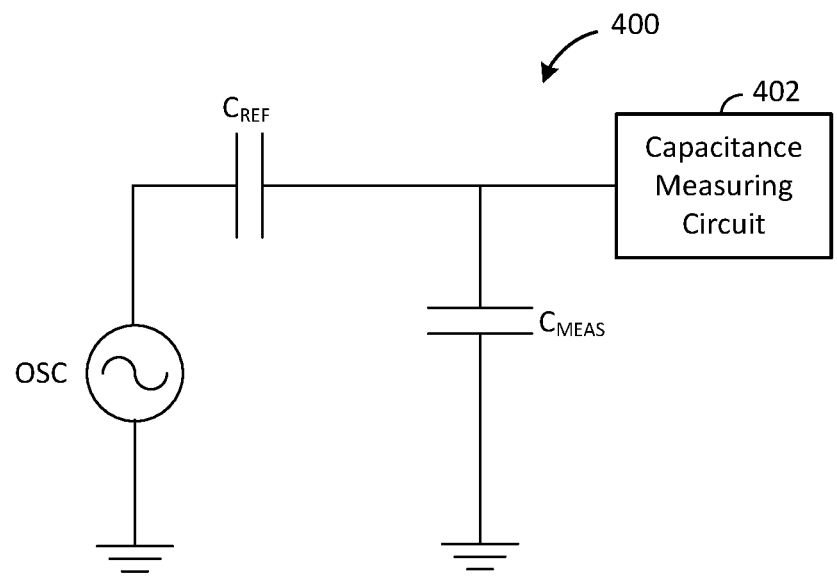
FIG. 7 depicts an example schematic diagram of certain components of a capacitance monitoring system in accordance with some embodiments of the present disclosure.

FIG. 7 depicts an example schematic diagram of certain components of a capacitance monitoring system in accordance with some embodiments of the present disclosure. In an embodiment, the components and circuitry depicted in FIG. 7 may correspond to a capacitance monitoring system 400 to detect (e.g., when no chip card 14 is present in the slot 21) capacitance changes within the contact interface 104 that may occur because of a tamper device being connected to the contact interface 104. Although particular components are depicted in the particular arrangement of FIG. 7, it will be understood that the capacitance monitoring system 400 may include additional components, one or more of the components depicted in FIG. 7 may not be included in the capacitance monitoring system 400, and the components of the capacitance monitoring system 400 may be rearranged in any suitable manner. In one embodiment, the capacitance monitoring system 400 includes at least an oscillator (OSC), a reference capacitor ($C_{REF}$) and a capacitance measuring circuit 402 to measure a capacitance ($C_{MEAS}$) associated with one or more components of the contact interface 104.

The components of the capacitance monitoring system 400 can be incorporated in the reader chip 100 and/or elsewhere in the payment reader 22. The capacitance monitoring system 400 can be arranged as a capacitance divider that uses the capacitance measuring circuit 402 to measure or determine changes in the component capacitance ($C_{MEAS}$)

The capacitance measuring circuit 402 can include a data acquisition circuit and one or more sensors. The capacitance measuring circuit 402 can determine changes in the component capacitance ($C_{MEAS}$) at predetermined intervals when no chip card 14 is present in the slot 21, or in some embodiments, when it is known that an authentic chip card 14 is present in the slot 21. The oscillator (OSC) can provide an output signal at a single fixed frequency or at a variable frequency that can be varied or selected from a range of frequencies. In one embodiment, the output signal provided by the oscillator (OSC) can be supplied by a clock of the reader chip 100. In other embodiments, the oscillator (OSC) can provide a pulse that can be phase and/or amplitude shifted as desired. If the oscillator is providing a pulse as the output signal, then the capacitance measuring circuit 402 may incorporate an A/D converter to digitize the corresponding measured signal, which can then be processed to determine a capacitance value. The reference capacitor ($C_{REF}$) can have a fixed capacitance in one embodiment. However, in other embodiments, the reference capacitor ($C_{REF}$) can have a variable capacitance that can be selected by a user. In one embodiment, the variable capacitance can be provided by selectively engaging and disengaging capacitors in a bank of capacitors to obtain the desired capacitance for the reference capacitor ($C_{REF}$).

Figure 8:
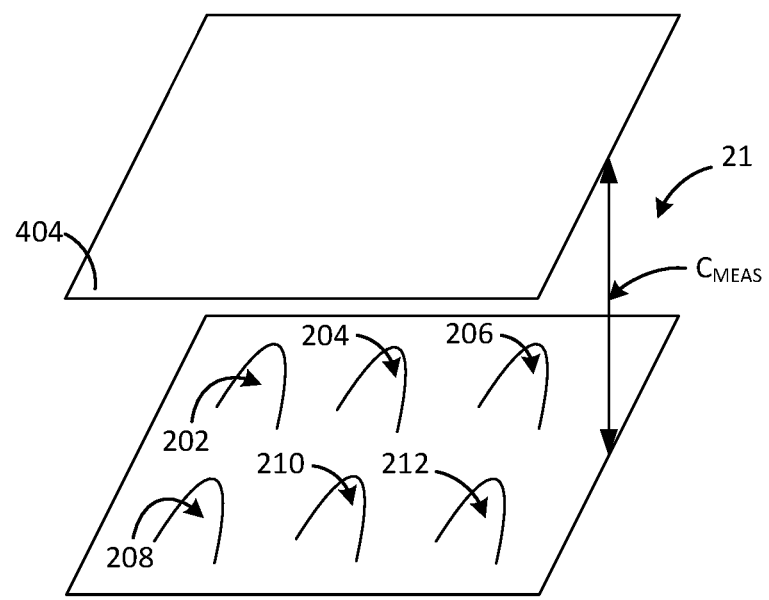
FIG. 8 depicts a partial exploded view of a slot of a payment reader in accordance with some embodiments of the present disclosure.

The capacitance measuring circuit 402 can measure a change in the capacitance between one or more components (e.g., connections 140) of the contact interface 104 and a reference point, when no chip card 14 is present in the slot 21, or in some embodiments, when it is known that an authentic chip card 14 is present in the slot 21. For example, as shown in FIG. 8, the capacitance measuring circuit 402 can measure the change in the component capacitance ($C_{MEAS}$) between a plate 404 and one or more of the pins of the voltage interface 202, the reset interface 204, the clock interface 206, the I/O interface 208, the ground interface 210, and the programming interface 212. The capacitance measuring circuit 402 can provide the measured change in component capacitance ($C_{MEAS}$) to the processing unit 120 for further processing and storage in memory 122 as directed by the contact interface tamper instructions 138. In one embodiment, the capacitance measuring circuit 402 can be operated in synchronicity with the clock and the oscillator (OSC) in order to perform phase-matched measurements. In other embodiments, the capacitance measuring circuit 402 can be used to measure the actual capacitance associated with the component instead of the change in capacitance.

The processing unit 120 can execute the contact interface tamper instructions 138 to establish a baseline for the component capacitance ($C_{MEAS}$) for each component (e.g., connections 140 or pins) of the contact interface 104 to be monitored and then compare subsequent determinations of the component capacitance ($C_{MEAS}$) to the baseline that is stored in memory 122 to determine if the component capacitance ($C_{MEAS}$) has changed by a threshold amount. A change in the component capacitance ($C_{MEAS}$) by a threshold amount may indicate that a tamper attempt has occurred (e.g., a tamper device has been connected to that component of the contact interface 104). In one embodiment, the baseline can be established prior to the use of the payment reader 22 for processing payment transactions (e.g., at the factory or during an initialization process for the payment reader 22). However, in other embodiments, the baseline for the component capacitance ($C_{MEAS}$) can be updated as the payment reader 22 processes payment transactions to account for changing conditions resulting from the usage of the components. For example, the position of the pins in the interfaces 202-212 may change over time because of frequent usage of the pins and wear on the springs used to position the pins. The corresponding change in the position of the pins can affect the component capacitance ($C_{MEAS}$) measurement associated with the pins thereby requiring an update to the baseline in order to avoid the registering of a false positive (i.e., the indication that a tamper device has been connected to the payment reader 22 when a tamper device has not actually been connected). The updating of the baseline can occur from periodic replacement of the baseline with a new baseline or by updating the baseline based on one or more prior responses (e.g., an average of a predetermined number of prior responses that did not provide an indication that a tamper attempt was made).

FIG. 8 depicts a partial exploded view of a slot 21 of a payment reader 22 in accordance with some embodiments of the present disclosure. In an embodiment, the components depicted in FIG. 8 can be used by capacitance measuring circuit 402 to measure changes in one or more component capacitances ($C_{MEAS}$) Although particular components are depicted in the particular arrangement of FIG. 8, it will be understood that the slot 21 may include additional components, one or more of the components depicted in FIG. 8 may not be included in the slot 21, and the components of the slot 21 may be rearranged in any suitable manner. In one embodiment, the slot 21 includes at least a pin on one side of slot 21 for each of the voltage interface 202, the reset interface 204, the clock interface 206, the I/O interface 208, the ground interface 210 and the programming interface 212, and a plate 404 on the opposite side of the slot 21 from the pins.

One or more of the pins for the voltage interface 202, the reset interface 204, the clock interface 206, the I/O interface 208, the ground interface 210 and the programming interface 212 can be coupled to the capacitance measuring circuit 402 (e.g., through sets of switches). In addition, the plate 404 can be coupled to the capacitance measuring circuit 402 to provide the reference point when determining the change in component capacitance ($C_{MEAS}$) When no EMV chip card 14 is present in the slot 21 (or in some embodiments, when a chip card 14 is present in the slot 21), the capacitance measuring circuit 402 can determine if a change in the component capacitance ($C_{MEAS}$) between the plate 404 and one or more of the pins of the voltage interface 202, the reset interface 204, the clock interface 206, the I/O interface 208, the ground interface 210 and the programming interface 212 has occurred thereby indicating a tamper attempt. In other embodiments, a change in the component capacitance ($C_{MEAS}$) for groups of pins (e.g., groups ranging from two pins to all of the pins of the contact interface 104) can be determined by the capacitance measuring circuit 402. In another embodiment, instead of a single plate 404 serving as the reference point for all of the pins, each pin can have a corresponding plate located on the opposite side of the slot 21. As discussed above, the determined change in the component capacitance ($C_{MEAS}$) from the capacitance measuring circuit 402 can be provided to processing unit 120. In another embodiment, the capacitance measuring circuit 402 can measure an actual component capacitance ($C_{MEAS}$) for a component instead of a change in the component capacitance ($C_{MEAS}$)

Figure 9:
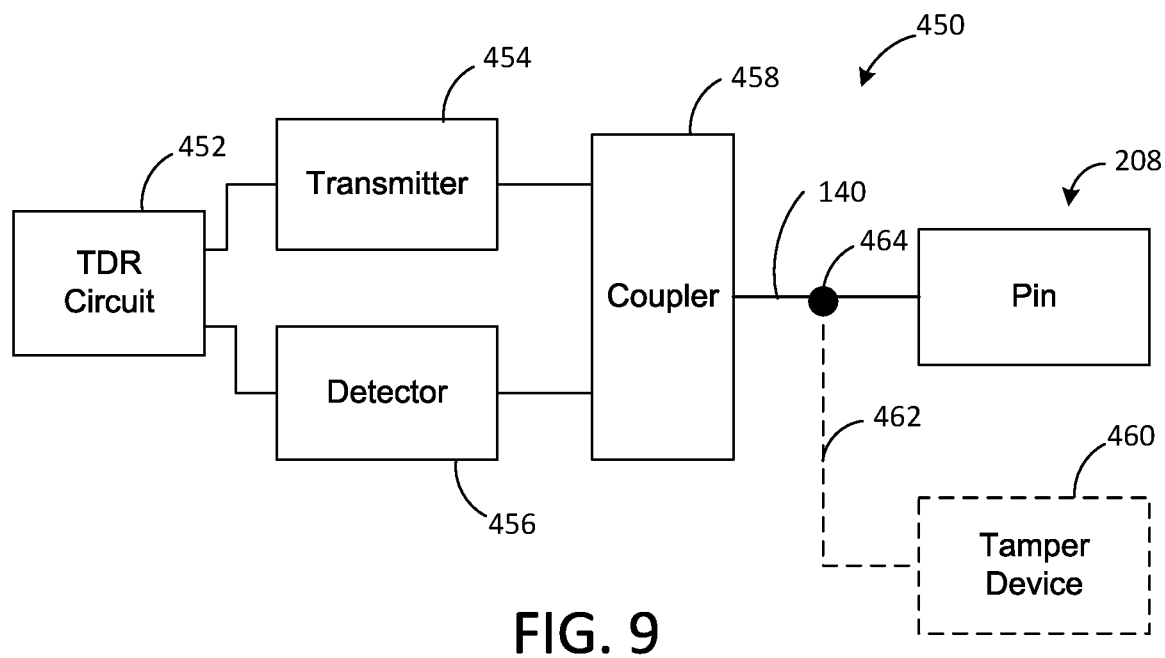
FIG. 9 depicts an illustrative block diagram of a time domain reflectometry (TDR) monitoring system in accordance with some embodiments of the present disclosure.

FIG. 9 depicts an illustrative block diagram of a time domain reflectometry (TDR) monitoring system in accordance with some embodiments of the present disclosure. In an embodiment, the components and circuitry depicted in FIG. 9 may correspond to a TDR monitoring system 450 to determine, when no chip card 14 is present in the slot 21, or in some embodiments, when it is known that an authentic chip card 14 is present in the slot 21, if unexpected reflections are returned that may indicate that a tamper attempt has occurred at the contact interface 104. Although particular components are depicted in the particular arrangement of FIG. 9, it will be understood that the TDR monitoring system 450 may include additional components, one or more of the components depicted in FIG. 9 may not be included in the TDR monitoring system 450, and the components of the TDR monitoring system 450 may be rearranged in any suitable manner. In one embodiment, the TDR monitoring system 450 includes at least a TDR circuit 452, a transmitter, 454, a detector 456, and a coupler 458.

The components of the TDR monitoring system 400 can be incorporated in the reader chip 100 and/or elsewhere in the payment reader 22. The TDR monitoring system 450 can include a TDR circuit 452 coupled to a transmitter 454 to transmit a pulse or signal on connection 140 that ends at the pin for the I/O interface 208. In other embodiments, the transmitter 454 can be coupled to a switch to transmit pulses on some or all of the remaining connections 140 coupled to the pins for the remaining interfaces of the contact interface 104. Alternatively, multiple transmitters 454 can be used to transmit pulses on multiple lines. In one embodiment, the pulse or signal sent by the transmitter can be either an electrical signal or an optical signal. Any anomalies on connection 140, such as improper termination at the pin, can result in a reflection being returned for detection by detector 456. Alternatively, multiple detectors 456 can be used to detect reflections on multiple lines. A coupler 458 can be used to connect the transmitter 454 and the detector 456 to the connection 140 or multiple connections 140 in some embodiments. In one embodiment, the TDR circuit 452, based on instructions in the contact interface tamper instructions 138, can control the transmission of pulses by the transmitter 454 and can process the reflections received by the detector 456.

Figure 10:
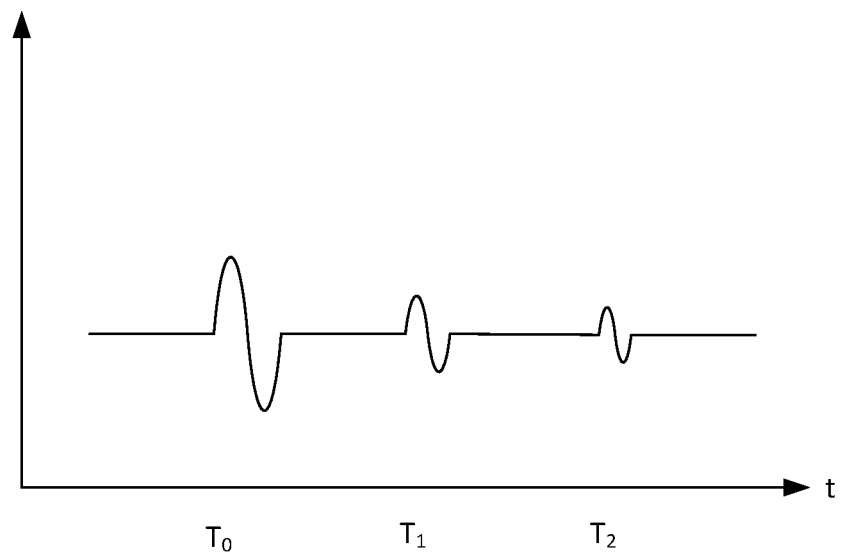
FIG. 10 depicts an illustrative reflection diagram for the TDR monitoring system of FIG. 9 in accordance with some embodiments of the present disclosure.

The TDR circuit 402 can monitor the transmission of pulses and the corresponding reflections returned from the pulses at predetermined intervals when no EMV chip card 14 is present in the slot 21, or in some embodiments, when it is expected that a chip card 14 is present in the slot 21. For example, as shown in FIG. 10, a pulse was transmitted on connection 140 at time $T_0$ and a first reflection from the pin associated with I/O interface 208 was received at time $T_1$. However, a second reflection was received at time $T_2$. The second reflection at time T2 can occur as a result of a tamper device 460 being coupled by line 462 to connection 140 at access point 464, and thus, introducing an additional anomaly or termination point in the circuit path. In the embodiment depicted in FIG. 10, the second reflection occurs after the first reflection because the path to the tamper device 460 is longer than the path to the pin for the I/O interface 208. If the path to the tamper device 460 was shorter than the path to the pin for the I/O interface 208 (e.g., a tamper line connected between the processer and the relevant pin of interface) then the reflection from the tamper device 460 would occur before the reflection from the pin for the I/O interface 208. The timing of reflections can correspond to the distance the pulse travels before being reflected in one embodiment. The TDR circuit 452 can provide information on the pulses and reflections in the diagram to the processing unit 120 for further processing and storage in memory 122 as directed by the contact interface tamper instructions 138.

The processing unit 120 can execute the contact interface tamper instructions 138 to establish a baseline for the pulses and reflections associated with each connection 140 of the contact interface 104 to be monitored. In one embodiment, the baseline can be established prior to the use of the payment reader 22 for processing payment transactions (e.g., at the factory or during an initialization process for the payment reader 22) and include information on the strength and timing of the reflections for particular pulses. However, in other embodiments, the baseline for the reflections can be updated as the payment reader 22 processes payment transactions to account for changing conditions resulting from the usage of the components. The processing unit 120 can then compare subsequent detections of reflections from pulses to the baseline that is stored in memory 122 to determine if additional reflections are occurring at different times, either before or after the expected reflections, are present, which may indicate that a tamper device 460 has been connected to a connection 140 of the contact interface 104. In an embodiment, machine learning can be used to identify details about the sizes and shapes of the reflections to better identify differences between the detected reflections and the baseline (e.g., by the payment service system 50).

In an embodiment, the transmitter 454 can be configured to use two or more drive impedances when sending the pulse on the connection 140. The use of multiple drive impedances by the transmitter 454 can limit the ability of the tamper device 460 to perform impedance matching with the connection 140 and transmitter 454 to minimize reflections generated by the tamper device 460 since the impedance is changing. In other embodiments, the transmitter 454 can incorporate a variable strength drive that can be used to drive the pulses at different slew rates.

Figure 11:
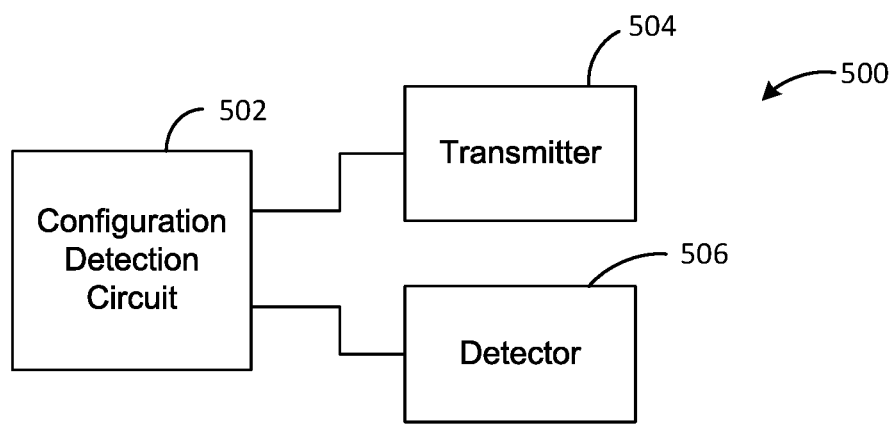
FIG. 11 depicts an illustrative block diagram of a configuration monitoring system in accordance with some embodiments of the present disclosure.

FIG. 11 depicts an illustrative block diagram of a configuration monitoring system in accordance with some embodiments of the present disclosure. In an embodiment, the components and circuitry depicted in FIG. 11 may correspond to a configuration monitoring system 500 to detect changes to the internal configuration of the contact interface 104. Although particular components are depicted in the particular arrangement of FIG. 11, it will be understood that the configuration monitoring system 500 may include additional components, one or more of the components depicted in FIG. 11 may not be included in the configuration monitoring system 500, and the components of the configuration monitoring system 500 may be rearranged in any suitable manner. In one embodiment, the configuration monitoring system 500 includes at least a configuration detection circuit 502, a transmitter 504 and a detector 506.

The components of the configuration monitoring system 500 can be incorporated in the reader chip 100 and/or elsewhere in the payment reader 22. The configuration monitoring system 500 can include a configuration detection circuit 502 coupled to a transmitter 504 to transmit a pulse or signal within the interior of the payment reader 22. In one embodiment, the pulse or signal sent by the transmitter 504 can be an audio signal, a sound wave, a light wave or signal, or a vibrational wave or signal. The reflections from the signal sent by the transmitter 504 can be detected by the detector 506. The detector can then provide corresponding data on the reflections to the configuration detection circuit 502 for further processing. In one embodiment, the configuration detection circuit 502, based on instructions in the contact interface tamper instructions 138, can control the transmission of pulses by the transmitter 504 and can process the data on the reflections received by the detector 506.

The configuration detection circuit 502 can monitor the transmission of signals from the transmitter 504 and the corresponding data regarding the reflections received by the detector 506 at predetermined intervals when no EMV chip card 14 is present in the slot 21, or in some embodiments, when it is expected that a chip card 14 is present in the slot 21. The configuration detection circuit 502 can provide information on the signals and reflections to the processing unit 120 for further processing and storage in memory 122 as directed by the contact interface tamper instructions 138.

The processing unit 120 can execute the contact interface tamper instructions 138 to establish a baseline of the internal configuration for the contact interface 104 based on the transmitted pulses and received data regarding reflections from the pulses. In one embodiment, the baseline can be established prior to the use of the payment reader 22 for processing payment transactions (e.g., at the factory or during an initialization process for the payment reader 22). However, in other embodiments, the baseline for the reflections can be updated as the payment reader 22 processes payment transactions to account for changing conditions resulting from the usage of the components. The processing unit 120 can then compare subsequent data regarding detected reflections to the baseline that is stored in memory 122 to determine if the internal configuration of the payment reader 22 or contact interface 104 has changed more than a threshold, which may indicate that a tamper attempt has been made on contact interface 104. In an embodiment, machine learning can be used to learn patterns associated with the subsequently detected reflections to better identify differences between the detected reflections and the baseline.

Figure 12:
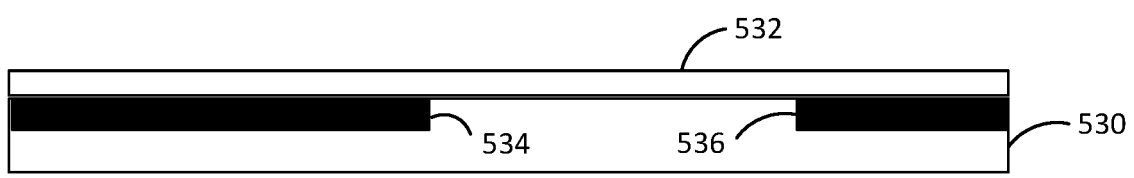
FIG. 12 depicts an illustrative touch monitoring system in accordance with some embodiments of the present disclosure.

FIG. 12 depicts an exemplary touch monitoring system in accordance with some embodiments of the present disclosure. In an embodiment, the components and circuitry depicted in FIG. 12 may correspond to a touch monitoring system 530 to identify touch events that correspond to tamper attempts with the contact interface 104. Although particular components are depicted in the particular arrangement of FIG. 12, it will be understood that the touch monitoring system 530 may include additional components, one or more of the components depicted in FIG. 12 may not be included in the touch monitoring system 530, and the components of the touch monitoring system 530 may be rearranged in any suitable manner. In one embodiment, the touch monitoring system 530 includes at least a printed circuit board (PCB) 532, touch detection component 534, processing unit 536, and contact interface 506.

In an embodiment, any suitable components of the systems described herein, (e.g., some or all components of reader chip 120, and/or additional components of payment reader 22) may be located on PCB 532. In an exemplary embodiment described herein, a processing unit 536 (e.g., corresponding to general processing unit 120 and cryptographic processing unit 125) is located on the printed circuit board (e.g., as components of reader chip 100) along with the contact interface 506 (e.g., corresponding to contact interface 104, whether or not contact interface 104 is integral to the reader chip 100).

One or more touch detection components 534 may be located on or adjacent to the PCB 532 or suitable components thereof. In an embodiment, the touch detection component 534 may be a touch detection layer that directly overlays sensitive components of the PCB. However, in other embodiments, the touch detection layer may be located at other suitable components that encompass, surround, interfere with, or otherwise limit access to the sensitive components. The touch detection layer may provide signals to a suitable component (e.g., processing unit 120) that are responsive to touch, and provide information including touch intensity and touch location. Although a touch detection component 534 may be implemented in a variety of manners, in an embodiment the touch detection layer may be a capacitive touch detection layer.

A tamper location may be determined based on touch information received from the touch detection layer, such as the intensity and locations of the touch detection layer. In an embodiment, a baseline touch response (e.g., touch signal intensity) may be determined for the touch detection layer, for example, in a secured environment such as a manufacturing location or service center. These baselines may be stored at the device for eventual use in assessing measured touch events with thresholds for those events. Thresholds may be used to determine whether touch events correspond to tamper attempts, based on intensity of a touch event and location. In some embodiments, different locations associated with different sensitive components may have different thresholds. In some embodiments, patterns of touch events may be determined to correspond to different tamper events. Different patterns of touch events at different locations of the touch detection layer may have different thresholds, e.g., based on different types of tamper attempts.

The touch event baselines, thresholds, and patterns may be dynamic and updateable. An exemplary dynamic modification may include factors that may impact the sensitivity of the touch detection layer or the type of likely touch event, such as temperature, physical location, humidity, altitude, observed noise levels, operation of other system components, and other similar aspects of the system and environment. Updates may be provided to change the baselines, thresholds, and patterns to account for new tamper attempts. These updates may be determined locally, or in some embodiments, at a remote server that aggregates data from numerous similar touch detection components to assess and identify tamper patterns.

Figure 13:
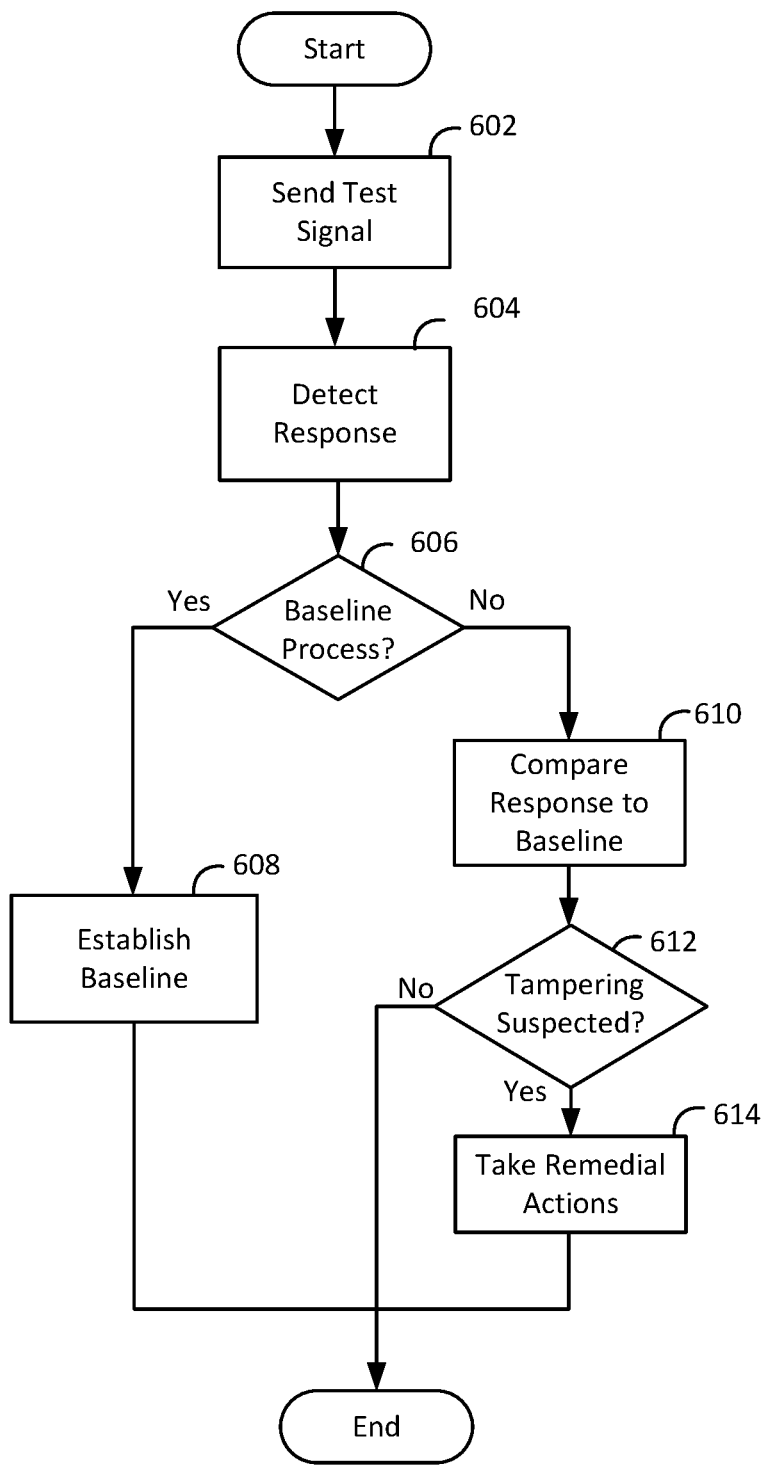
FIG. 13 depicts a non-limiting flow diagram illustrating exemplary steps for determining a tamper attempt in a contact interface for a payment reader in accordance with some embodiments of the present disclosure.

In view of the structures and devices described supra, methods that can be implemented in accordance with the disclosed subject matter will be better appreciated with reference to the flowchart of FIG. 13. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 13 depicts a non-limiting flow diagram illustrating exemplary steps for determining a tamper attempt at a contact interface 104 in accordance with some embodiments of the present disclosure. In some embodiments, the tamper determination sequence can be conducted whenever there is no EMV chip card 14 present in the slot 21, or in some embodiments, when it is expected that a chip card 14 is present in the slot 21. The tamper determination sequence can be used to establish a baseline that is then compared to subsequent responses to determine if the current state of the contact interface 104 has changed from the state of the contact interface 104 established in the baseline.

At step 602, the tamper determination sequence may begin by the general processor 120 calling the contact interface tamper instructions 138 to send a test signal if there is no EMV chip card 14 present in the slot 21, or in some embodiments, when it is expected that a chip card 14 is present in the slot 21. Depending on the particular techniques and/or monitoring systems being used for the tamper determination sequence, the form of the test signal may be different. For example, the test signal can be a pulse from transmitter 454 if the TDR monitoring system 450 is being used, while the test signal may be a waveform from the oscillator (OSC) if the capacitance monitoring system 400 is being used. Once the test signal is sent, processing may continue to step 604. In other embodiments, multiple test signals can be sent if several techniques are being used for tamper determination and/or if multiple components of the payment reader 22 are being monitored for tamper attempts. For example, multiple test signals may be sent if more than one capacitance is being measured by capacitance monitoring system 400 or if multiple connections 140 are being checked for tamper devices by the TDR monitoring system 450.

At step 604, the corresponding response from the test signal is detected and provided to the processing unit 120. The nature of the response is dependent on the technique and/or monitoring system being used for the tamper determination sequence. For example, if the TDR monitoring system 450 were being used, then the response would include one or more reflections, while a capacitance value may be the response when the capacitance monitoring system 400 is being used. When the processing unit 120 receives the response, the processing unit 120 determines if the contact interface tamper instructions 138 are establishing a baseline at step 606. A baseline can be established prior to the payment reader 22 being used to process payment transactions or at any time during the life of the payment reader 22. Once the baseline determination has been made at step 606, processing may continue to step 608 or 610 based on the result of the baseline establishment determination. In the embodiment of FIG. 13, if it is determined that a baseline is being established, the sequence may proceed to step 608. If it is determined that no baseline is being established in step 606, the sequence may proceed to step 610.

At step 608, a baseline is established based on the detected response to the test signal and the process ends. In one embodiment, the baseline can be established as being equivalent to the detected response. However, in other embodiments, the process may be repeated and several detected responses can be used to establish the baseline. If multiple test signals had been sent in step 602, then the multiple responses can be used to establish a single baseline or multiple baselines depending on the technique and/or monitoring system being used for the tamper determination sequence. Once the baseline is established, the baseline can be stored in memory 122 for comparison to subsequent responses and the processing of FIG. 13 may end.

If processing has continued to step 610, the detected responses are then compared to the corresponding baseline stored in memory 122. At step 612, a determination is made as to whether a tamper attempt is suspected based on the comparison of the detected response to the baseline. In one embodiment, if the detected response is similar to the baseline (i.e., within a predefined threshold of the baseline), then no tamper attempt is suspected. However, if the detected response is different from the baseline (e.g., the capacitance values do not match or if additional or unexpected reflections are detected), then a tamper attempt is suspected and the connection of a tampering device is believed to be the source of the differences. If a tamper attempt is suspected at step 612, the sequence proceeds to step 614 for remedial action to be taken as described herein. Otherwise, if no tamper attempt is suspected at step 612, then the process ends.

Figure 14:
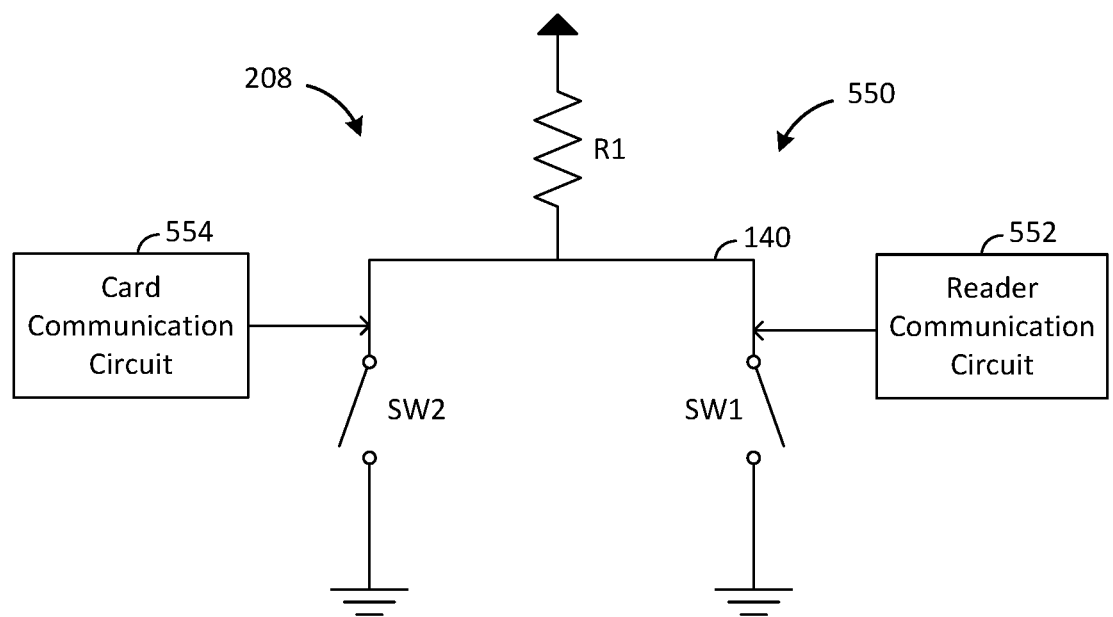
FIG. 14 depicts an example schematic diagram of certain components of a I/O interface monitoring system in accordance with some embodiments of the present disclosure.

FIG. 14 depicts an example schematic diagram of certain components of an I/O interface monitoring system in accordance with some embodiments of the present disclosure. In an embodiment, the components and circuitry depicted in FIG. 14 may correspond to an I/O monitoring system 550 at the I/O interface 208 that can detect a tamper attempt and can be used to conceal data being transmitted between the chip card 14 and the reader chip 100 at the I/O interface 208. Although particular components are depicted in the particular arrangement of FIG. 14, it will be understood that the I/O monitoring system 550 may include additional components, one or more of the components depicted in FIG. 14 may not be included in the I/O monitoring system 550, and the components of the I/O monitoring system 550 may be rearranged in any suitable manner. In one embodiment, the I/O monitoring system 550 includes at least a pull-up resistor (R1), a first switch (SW1), a second switch (SW2), a reader communication circuit 552 and a card communication circuit 554.

The I/O monitoring system 550 can be at least partially implemented at the I/O interface 208 and include a reader communication circuit 552 coupled to a first switch (SW1) and a card communication circuit 554 coupled to a second switch (SW2). A pull-up resistor (R1) is coupled to both the first switch (SW1) and the second switch (SW2) at one end and is coupled to a bias voltage (e.g., 3.3 V) at the opposite end. The pull-up resistor (R1) can be used in the communication of 1's and 0's between the EMV chip card 14 and the reader chip 100 using a pull-up resistor based communication protocol (e.g., UART). Each of the reader communication circuit 552 and the card communication circuit 554 can include an open drain transistor coupled to the pull-up resistor (R1). When the reader chip 100 wants to transmit a 1 to the chip card 14, the reader communication circuit 552 can open the first switch (SW1) to have the pull-up resistor (R1) pull the connection 140 up to the bias voltage and when the reader chip 100 wants to transmit a 0 to the chip card 14, the reader communication circuit 552 can close the first switch (SW1) and pull the connection 140 to ground. Similarly, when the chip card 14 wants to transmit a 1 to the reader chip 100, the card communication circuit 554 can open the second switch (SW2) to have the pull-up resistor (R1) pull the connection 140 up to the bias voltage and when the chip card 14 wants to transmit a 0 to the reader chip 100, the card communication circuit 554 can close the second switch (SW2) and pull the connection 140 to ground.

In an embodiment, the reader communication circuit 552 can be used to detect a tamper attempt at the I/O interface 208. For example, the reader communication circuit 552 can send a UART signal by changing the state of the connection 140 (e.g., from a 1 to a 0 or from a 0 to a 1) using the first switch (SW1) during a time period that the reader communication circuit 552 knows that the chip card 14 can't read data. If a tamper device is connected to the I/O interface 208 and/or corresponding connection 140, the tamper device might then change the state of the connection 140 (in response to the change of state from the UART signal sent by the reader communication circuit 552). The reader communication circuit 552 can detect this change in state on connection 140 by the tamper device at a time when the chip card 14 is unable to make such a change thereby providing information to the reader communication device 552 that a tamper attempt has occurred.

In other embodiments, the reader communication circuit 552 can alter the data communication sequence between the chip card 14 and the reader chip 100 in order to conceal, from a tamper device, the data being communicated between the chip card 14 and the reader chip 100 at the I/O interface 208. In an embodiment, the clock frequency used by the reader communication circuit 552 and the card communication circuit 554 can be changed or randomized at a predefined intervals in order to make data extraction and interpretation by a tamper device more difficult. In another embodiment, the data transmission by the card communication circuit 554 at the I/O interface 208 may be interrupted and subsequently restarted by the sending of a reset signal to reset interface 204. In addition, the reader communication circuit 552 may send bogus data (e.g., jammer signals, noise, or clock jitters) over connection 140 for the I/O interface 208 during the period after the reset signal and before the retransmission of the data by the card communication circuit 554 begins.

In a further embodiment, the I/O monitoring system 550 can implement a time-based differentiated reading process that has the reader communication circuit 522 operating at a clock frequency that is greater than the clock frequency that is used by the card communication circuit 554. By having a greater clock frequency, the reader communication circuit 552 can more quickly read the data being communicated by the card communication circuit 554 and may take other actions before the card communication circuit 554 is ready to read or transmit further data. The reader communication circuit 552 may send bogus data (e.g., jammer signals, noise, or clock jitters) over connection 140 for the I/O interface 208 during the period after the reader communication circuit 552 has sent data to or read the data from the card communication circuit 554 and before the card communication circuit 554 transmits or reads the next set of data.

Figure 15:
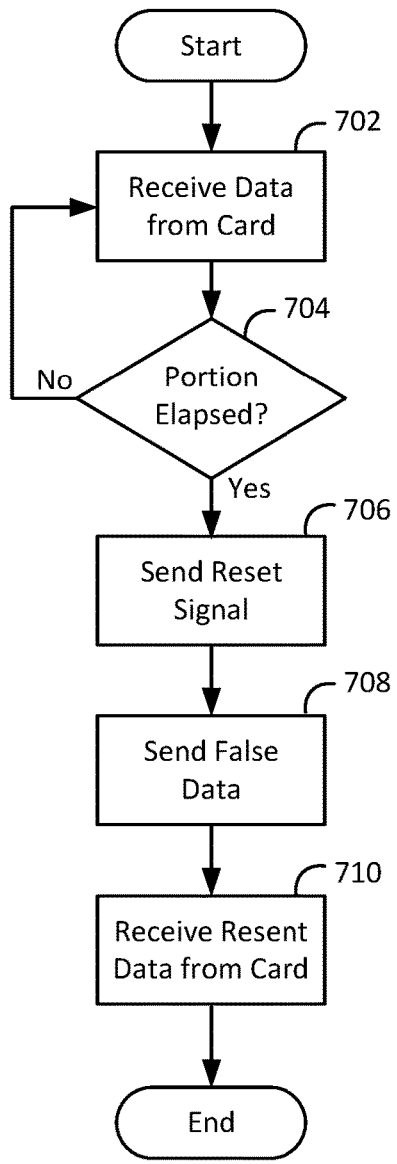
FIGS. 15 and 16 depict non-limiting flow diagrams illustrating exemplary steps for concealing data retrieved by a tamper device in accordance with some embodiments of the present disclosure.
Figure 16:
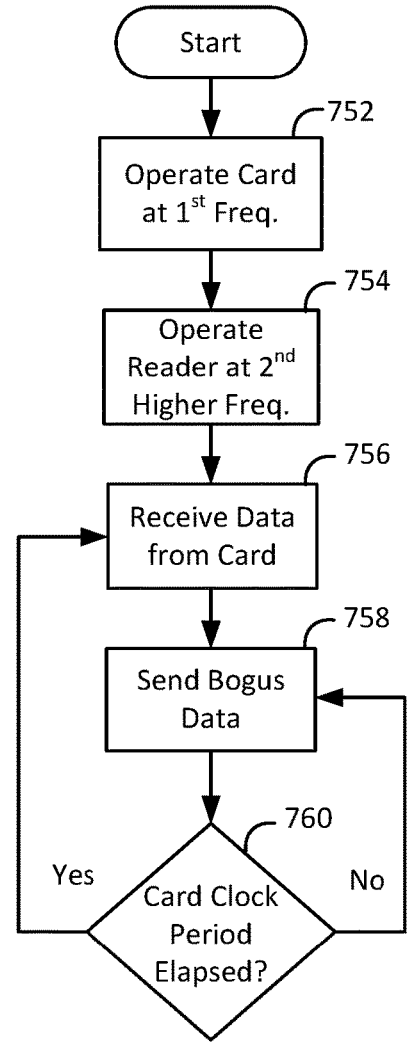

In view of the structures and devices described supra, methods that can be implemented in accordance with the disclosed subject matter will be better appreciated with reference to the flowcharts of FIGS. 15 and 16. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIGS. 15 and 16 depict non-limiting flow diagrams illustrating exemplary steps for concealing data extracted by a tamper device in accordance with some embodiments of the present disclosure. The process of FIG. 15 conceals the data communicated by the chip card 14 located in the slot 21 of the payment reader 22 by sending a reset signal to restart the data transmission process. The process of FIG. 16 conceals the data communicated by the chip card 14 located in the slot 21 of the payment reader 22 by sending bogus data during an interval between the communication of data with the chip card 14.

The process of FIG. 15 begins at step 702 by having the general processor 120 calling the contact interface tamper instructions 138 to have the reader communication circuit 552 receive data from the card communication circuit 554 as described above. At step 704, a determination is made as to whether a predefined portion of the data to be transmitted by the card communication circuit 554 has actually been sent by the card communication circuit 554. The predefined portion of data to be transmitted can be based on amount of data that is transmitted or an amount of time that data has been transmitted. If the predefined portion of data has not been transmitted, the process returns to step 702 to continue with the reader communication circuit 552 receiving data from the card communication circuit 554.

However, if the predefined portion of data has been transmitted at step 702, then a reset signal is sent to the chip card 14 via reset interface 204 at step 706. Optionally, after the reset signal is sent at step 706, bogus data can be sent over connection 140 for the I/O interface 208 by the reader communication device 552 at step 708. At step 710, the card communication circuit 554 can begin to resend the data to the reader communication circuit 552 and the process can end upon the completion of the data transmission by the card communication circuit 554. In an embodiment, steps 704-708 can be re-executed during the resending of the data in step 710.

The process of FIG. 16 begins at steps 752 and 754 by having the general processor 120 execute the contact interface tamper instructions 138 to have the reader communication circuit 552 operate at a frequency that is significantly greater than the frequency at which the card communication circuit 554 operates (e.g., 200 MHz vs. 5 MHz). In one embodiment, a variety of clock frequencies may be available such that the second clock frequency may be at least 1.01, 2, 10, 100, 1000, or greater times more than the first clock frequency. At step 756, the reader communication circuit 552 can begin to communicate data with the card communication circuit 554, as described herein. Since the reader communication circuit 552 is operating at a higher clock frequency than the card communication circuit 554, the reader communication circuit 552 may finish sending while the card communication circuit 554 is in a downtime until the next period of its clock cycle at which data may be sent or read.

Once the reader communication circuit 552 finishes sending reading the data, the reader communication circuit 552 can then begin to send bogus data over connection 140 for the I/O interface 208 at step 758 (e.g., while the card communication circuit is waiting for its next clock cycle). At step 760, a determination is made as to whether the clock period for the card communication circuit 554 has elapsed (or is close to elapsing). If the clock period has elapsed in step 760, the reader communication circuit 552 stops sending bogus data and begins to communicate data again with the card communication device 554 in step 756. If the clock period has not elapsed in step 760, the reader communication circuit 552 continues to sending bogus data in step 758.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A transaction device for exchanging information with a chip card, comprising:
a contact interface comprising a plurality of pins configured to interface with a chip card; a monitoring system coupled to the contact interface;
a processing unit coupled to the contact interface and the monitoring system, the processing unit configured to execute instructions;
a memory device having the instructions stored thereon and coupled to the processing unit to provide the instructions to the processing unit, wherein the instructions cause the processing unit to:
send a test signal to one or more components of the contact interface via the monitoring system;
receive a response value, based on the test signal, from the one or more components of the contact interface via the monitoring system;
compare the response value to a baseline value associated with the one or more components of the contact interface; and
detect an attempt to tamper with the contact interface based on the response value being different from the baseline value.

2. The transaction device of claim 1, wherein the instructions cause the processing unit to take corrective action in response to a detection of an attempt to tamper with the contact interface.

3. The transaction device of claim 2, wherein the corrective action includes one or more of disabling one or more components of the transaction device or employing countermeasures to damage a tamper device attempting to tamper with the contact interface.

4. The transaction device of claim 1, wherein the instructions cause the processing unit to apply the test signal to the one or more components of the contact interface when a chip card is not present at the contact interface.

5. The transaction device of claim 4, wherein the test signal is a capacitance measurement signal and the response value is a capacitance value associated with the capacitance measurement signal.

6. The transaction device of claim 5, wherein the capacitance measurement signal is applied to at least one pin of the plurality of pins and the response value is a capacitance value associated with a capacitance between the at least one pin and a plate positioned opposite the at least one pin in the contact interface.

7. The transaction device of claim 4, wherein the test signal is a time-domain reflection pulse and the response value is a time delayed reflection value associated with the time-domain reflection pulse.

8. The transaction device of claim 7, wherein the time delayed reflection value corresponds to a reflection of the time-domain reflection pulse from a corresponding pin of the plurality of pins.

9. The transaction device of claim 1, wherein the baseline value is modified during operation of the transaction device.

10. A method of detecting an attempt to tamper with a contact interface of a transaction device, the method comprising:
- providing a monitoring system, wherein the monitoring system is coupled to a processing unit and a contact interface;
- sending, by the processing unit, a test signal to one or more components of the contact interface via the monitoring system;
- receiving, by the processing unit, a response value, based on the test signal, from the one or more components of the contact interface via the monitoring system;
- comparing the response value to a baseline value associated with the one or more components of the contact interface; and
- detecting an attempt to tamper with the contact interface based on the response value being different from the baseline value.

11. The method of claim 10, further comprising taking a corrective action in response to a detection of an attempt to tamper with the contact interface, wherein taking a corrective action includes one or more of disabling one or more components of the transaction device or employing countermeasures to damage a tamper device attempting to tamper with the contact interface.

12. The method of claim 10, wherein sending the test signal to one or more components of the contact interface includes applying the test signal to the one or more components of the contact interface when a chip card is not present at the contact interface.

13. The method of claim 12, wherein the contact interface comprises a plurality of pins, the test signal is a capacitance measurement signal applied to at least one pin of the plurality of pins, and the response value is a capacitance value associated with a capacitance between the at least one pin and a plate positioned opposite the at least one pin in the contact interface.

14. The method of claim 12, wherein the contact interface comprises a plurality of pins, the test signal is a time-domain reflection pulse, and the response value is a time delayed reflection value associated with a reflection of the time-domain reflection pulse from a corresponding pin of the plurality of pins.

15. The method of claim 10, further comprising determining the baseline value before the transaction device processes a transaction.

16. A payment reader comprising:
- a chip card interface, wherein the chip card interface is configured to receive payment information from a chip card;
- a monitoring system coupled to the chip card interface;
- a processing unit coupled to the chip card interface and the monitoring system, the processing unit configured to execute instructions;
- a memory device having the instructions stored thereon and coupled to the processing unit to provide the instructions to the processing unit, wherein the instructions cause the processing unit to:
  - send a test signal to one or more components of the chip card interface via the monitoring system;
  - receive a response value, based on the test signal, from the one or more components of the chip card interface via the monitoring system;
  - compare the response value to a baseline value associated with the one or more components of the chip card interface; and
  - detect an attempt to tamper with the chip card interface based on the response value being different from the baseline value.

17. The payment reader of claim 16, wherein the instructions cause the processing unit to take corrective action in response to a detection of an attempt to tamper with the chip card interface, wherein the corrective action includes one or more of disabling one or more components of the payment reader or employing countermeasures to damage a tamper device attempting to tamper with the chip card interface.

18. The payment reader of claim 16, wherein the instructions cause the processing unit to apply the test signal to the one or more components of the chip card interface when a chip card is present at the chip card interface.

19. The payment reader of claim 18, wherein the test signal is a capacitance measurement signal applied to at least one pin of the chip card interface and the response value is a capacitance value associated with a capacitance between the at least one pin and a plate positioned opposite the at least one pin in the chip card interface.

20. The payment reader of claim 18, wherein the test signal is a time-domain reflection pulse and the response value is a time delayed reflection value associated with a reflection of the time-domain reflection pulse from a corresponding pin of the chip card interface.

* * * * *